US012659088B2

(12) United States Patent
Lee et al.

(10) Patent No.: US 12,659,088 B2
(45) Date of Patent: Jun. 16, 2026

(54) HARQ FEEDBACK BASED ON COMMUNICATION RANGE AND LOCATION OF DEVICES

(71) Applicant: LG Electronics Inc., Seoul (KR)

(72) Inventors: Youngdae Lee, Seoul (KR); Seungmin Lee, Seoul (KR); Giwon Park, Seoul (KR); Hanbyul Seo, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 270 days.

(21) Appl. No.: 17/799,810

(22) PCT Filed: Mar. 25, 2021

(86) PCT No.: PCT/KR2021/003683
§ 371 (c)(1),
(2) Date: Aug. 15, 2022

(87) PCT Pub. No.: WO2021/194269
PCT Pub. Date: Sep. 30, 2021

(65) Prior Publication Data
US 2023/0078336 A1     Mar. 16, 2023

(30) Foreign Application Priority Data
Mar. 26, 2020     (KR) ........................ 10-2020-0036770

(51) Int. Cl.
*H04L 1/1867*     (2023.01)
*H04L 1/1825*     (2023.01)

(52) U.S. Cl.
CPC .......... *H04L 1/1887* (2013.01); *H04L 1/1825* (2013.01)

(58) Field of Classification Search
CPC ........................... H04L 1/1887; H04L 1/1825
See application file for complete search history.

(56) References Cited

U.S. PATENT DOCUMENTS

| | | | |
|---|---|---|---|
| 11,563,528 B2 * | 1/2023 | Ryu ...................... | H04W 72/20 |
| 2014/0243026 A1 * | 8/2014 | Essigmann ........... | H04W 68/02 |
| | | | 455/458 |

(Continued)

OTHER PUBLICATIONS

3GPP TR 38.885 V16.0.0 (Mar. 2019), "3rd Generation Partnership Project; Technical Specification Group Radio Access Network; NR; Study on NR Vehicle-to-Everything (V2X) (Release 16)," Mar. 2019, 122 pages.

(Continued)

*Primary Examiner* — Habte Mered
*Assistant Examiner* — Nevena Zecevic Sandhu
(74) *Attorney, Agent, or Firm* — Fish & Richardson P.C.

(57) ABSTRACT

A method and apparatus for hybrid automatic repeat request (HARQ) feedback based on a communication range and location of devices. A first device (e.g., receiving user equipment in sidelink) receives, from a second device (e.g., transmitting user equipment in sidelink), control information including 1) a communication range, and 2) a location of the second device. The first device determines whether to perform a hybrid automatic repeat request (HARQ) feedback based on whether a distance between a location of the first device for the control information and the location of the second device is smaller or equal to the communication range.

11 Claims, 12 Drawing Sheets

(56) References Cited

U.S. PATENT DOCUMENTS

| | | | | |
|---|---|---|---|---|
| 2016/0094669 A1* | 3/2016 | Karampurwala | ....... | H04W 4/02 |
| | | | | 370/328 |
| 2021/0051511 A1* | 2/2021 | Ali | ........................ | H04W 4/40 |
| 2022/0247539 A1* | 8/2022 | Luo | ...................... | H04L 1/1854 |
| 2022/0368461 A1* | 11/2022 | Zhang | ................. | H04W 72/23 |

OTHER PUBLICATIONS

3GPP TS 36.321 V15.8.0 (Dec. 2019), "3rd Generation Partnership Project; Technical Specification Group Radio Access Network; Evolved Universal Terrestrial Radio Access (E-UTRA); Medium Access Control (MAC) protocol specification (Release 15)," Dec. 2019, 134 pages.

3GPP TSG RAN WG1 #100-e, "LS on sidelink HARQ," R1-2001426, e-Meeting, Feb. 24-Mar. 6, 2020.

Fujitsu, "Dynamic Resource Selection for NR Sidelink," 3GPP TSG RAN WG1 #98, R1-1908220, Prague, CZ, Aug. 26-30, 2019, 16 pages.

LG Electronics Inc., "Introduction of 5G V2X with NR Sidelink," 3GPP TSG-RAN WG2 #109e, R2-2002316, Online, Feb. 24-Mar. 6, 2020, 36 pages.

LG Electronics, "Feature lead summary#2 for AI 7.2.4.5 Physical layer procedures for sidelink," 3GPP TSG RAN WG1 #100, R1-2001338, e-Meeting, Feb. 24-Mar. 6, 2020.

Panasonic, "Discussion on sidelink resource allocation in mode 2 for NR V2X," 3GPP TSG RAN WG1 # 98, R1-1908804, Prague, Czechia, Aug. 26-30, 2019, 6 pages.

Qualcomm Inc., "On NR V2X Distance-Based HARQ For Groupcast," 3GPP TSG-RAN WG4 #94e, R4-2000769, Feb. 24-Mar. 6, 2020, 3 pages.

Vivo, et al., "Remaining issues on physical layer procedure for NR sidelink," 3GPP TSG RAN WG1 #100e, R1-2000321, Feb. 24-Mar. 6, 2020, 17 pages.

Office Action in Korean Appln. No. 10-2022-7036463, mailed on Jul. 5, 2023, 10 pages (with English translation).

Sequans Communications, "On HARQ procedure for NR sidelink," 3GPP TSG RAN WG1 Meeting #99, R1-1913012, Reno, USA, Nov. 18-22, 2019, 6 pages.

* cited by examiner

FIG. 2

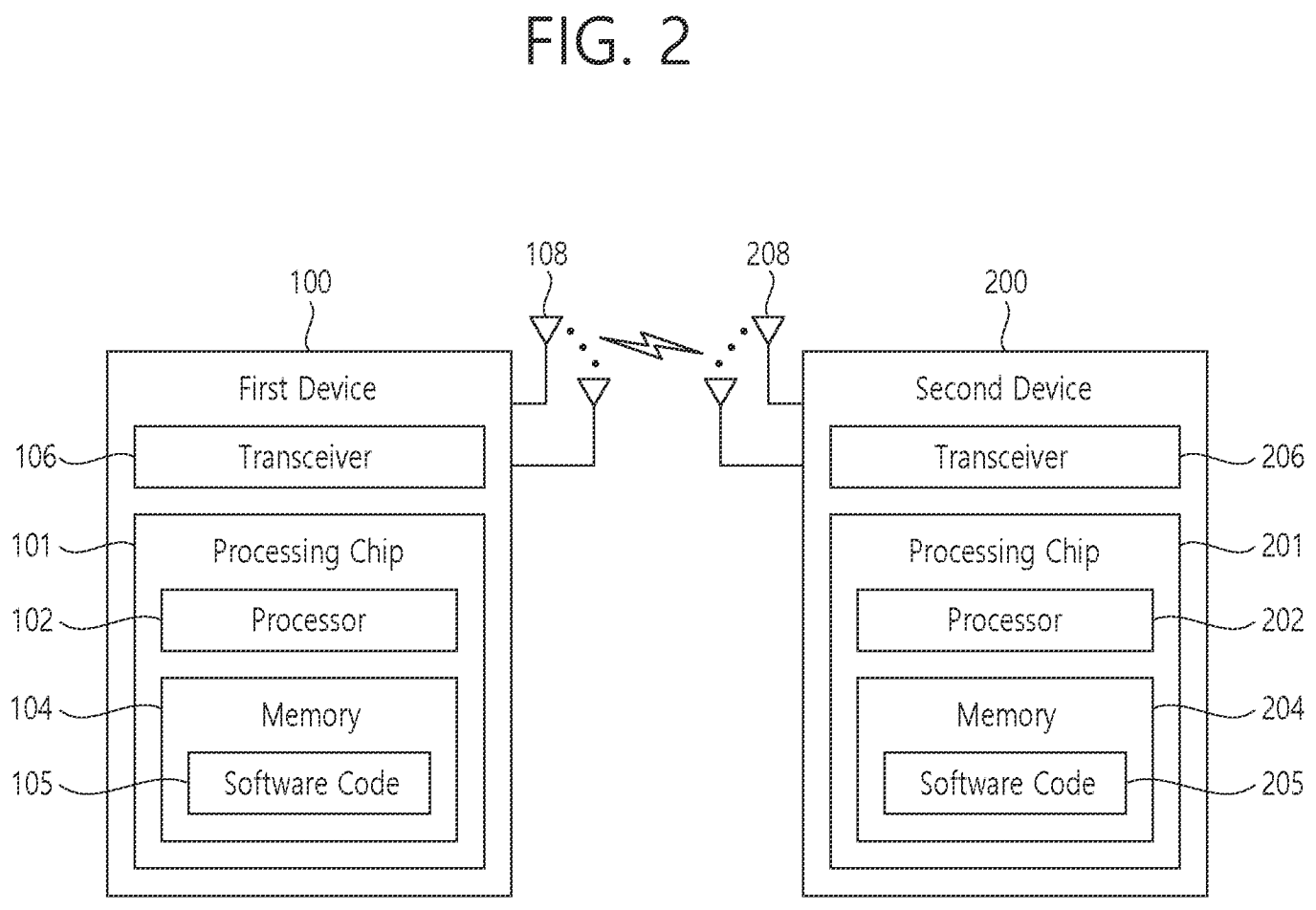

First Device 100

Transceiver 106

Processing Chip 101

Processor 102

Memory 104

Software Code 105

108

208

Second Device 200

Transceiver 206

Processing Chip 201

Processor 202

Memory 204

Software Code 205

FIG. 3

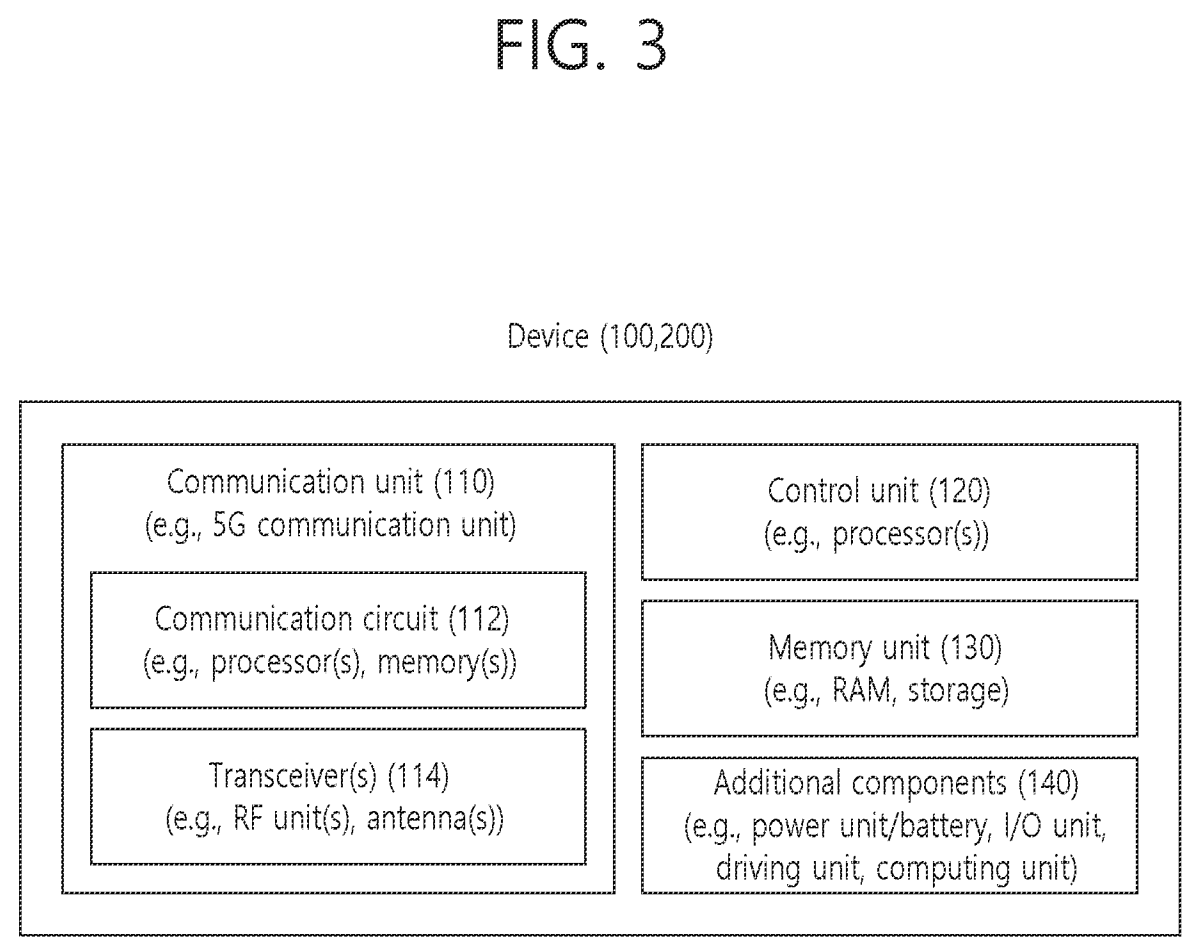

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

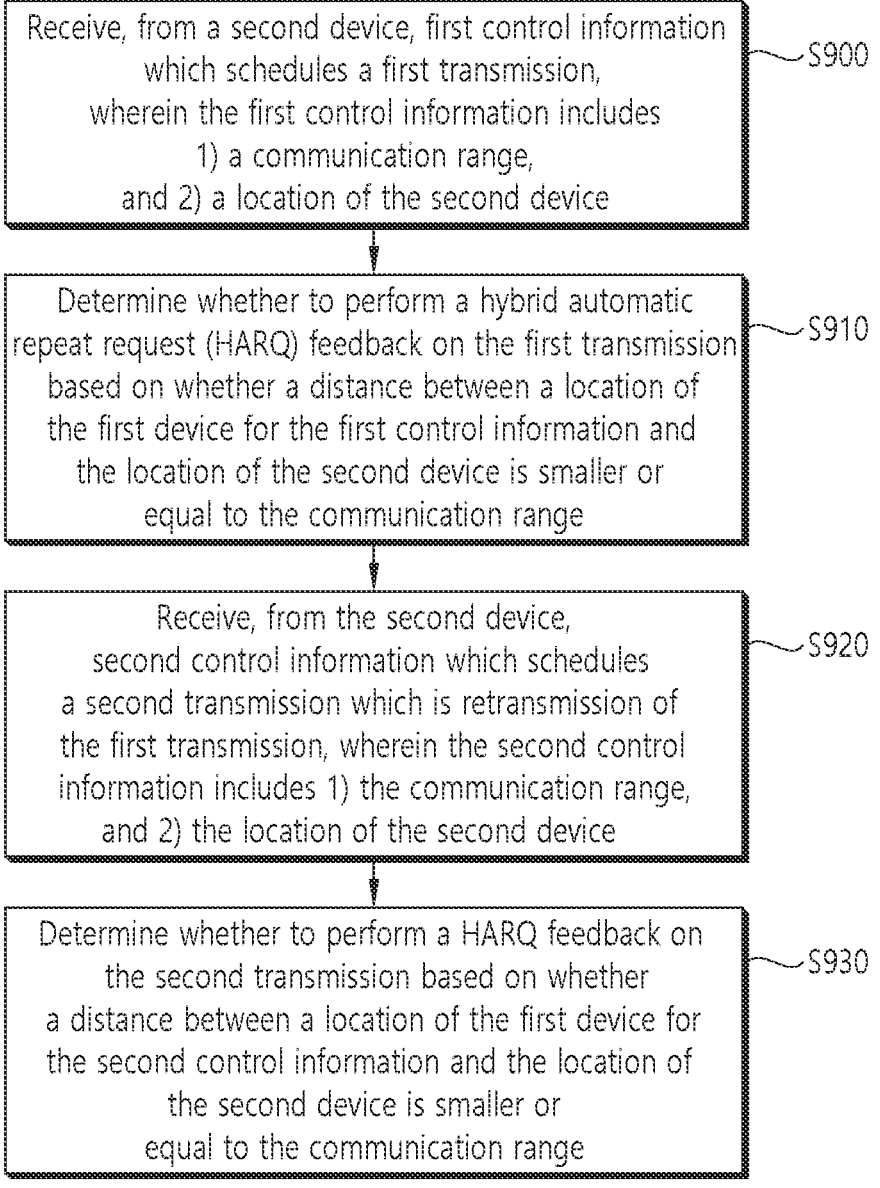

Receive, from a second device, first control information
which schedules a first transmission,
wherein the first control information includes
1) a communication range,
and 2) a location of the second device                    ~S900

Determine whether to perform a hybrid automatic
repeat request (HARQ) feedback on the first transmission    ~S910
based on whether a distance between a location of
the first device for the first control information and
the location of the second device is smaller or
equal to the communication range Receive, from the second device,
second control information which schedules            ~S920
a second transmission which is retransmission of
the first transmission, wherein the second control
information includes 1) the communication range,
and 2) the location of the second device Determine whether to perform a HARQ feedback on
the second transmission based on whether              ~S930
a distance between a location of the first device for
the second control information and the location of
the second device is smaller or
equal to the communication range

HARQ FEEDBACK BASED ON COMMUNICATION RANGE AND LOCATION OF DEVICES

CROSS-REFERENCE TO RELATED APPLICATIONS

This application is a National Stage application under 35 U.S.C. § 371 of International Application No. PCT/KR2021/003683, filed on Mar. 25, 2021, which claims the benefit of Korean Patent Application No. 10-2020-0036770, filed on Mar. 26, 2020. The disclosures of the prior applications are incorporated by reference in their entirety.

TECHNICAL FIELD

The present disclosure relates to hybrid automatic repeat request (HARQ) feedback based on a communication range and location of devices.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for determining whether to perform hybrid automatic repeat request (HARQ) feedback for transmission based on communication range and distance between devices.

Another aspect of the present disclosure is to provide a method and apparatus for determining priorities between transmissions over multiple configured grants and/or priorities between transmission over configured grant and other type of transmission/reception.

In an aspect, a method performed by a first device operating in a wireless communication system is provided. The method includes receiving, from a second device, control information including 1) a communication range, and 2) a location of the second device, and determining whether to perform a hybrid automatic repeat request (HARQ) feedback based on whether a distance between a location of the first device for the control information and the location of the second device is smaller or equal to the communication range.

In another aspect, a method performed by a second device operating in a wireless communication system is provided. The method includes determining transmission information of a transport block (TB) which includes 1) a communication range and 2) a location of the second device, transmitting, to a first device, first control information, which schedules a transmission of the TB, including the transmission information, and transmitting, to the first device, second control information, which schedules a retransmission of the TB, including the transmission information.

In another aspect, apparatuses implementing the above methods are provided.

The present disclosure can have various advantageous effects.

For example, the RX UE can determine its location of at each SCI, allowing to calculate the distance between the RX UE and TX UE more accurately.

For example, by calculating the distance between the RX UE and TX UE more accurately, whether to perform HARQ feedback can be determined more accurately by comparing the distance between the RX UE and TX UE and the communication range requirement.

For example, a UE performing HARQ transmissions of multiple configured grants can properly prioritize new transmission or retransmission of a configured grant, in particular when multiple configured grants overlap or a configured grant overlaps with other type of transmission.

For example, the system can properly handle multiple types of transmissions for a UE performing HARQ transmissions.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 2 shows an example of wireless devices to which implementations of the present disclosure is applied.

FIG. 3 shows an example of a wireless device to which implementations of the present disclosure is applied.

FIG. 8 shows a data flow example in the 3GPP NR system to which implementations of the present disclosure is applied.

FIG. 9 shows an example of a method performed by a first device (e.g., RX UE) to which implementation 1 of the present disclosure is applied.

DETAILED DESCRIPTION

Figure 1:
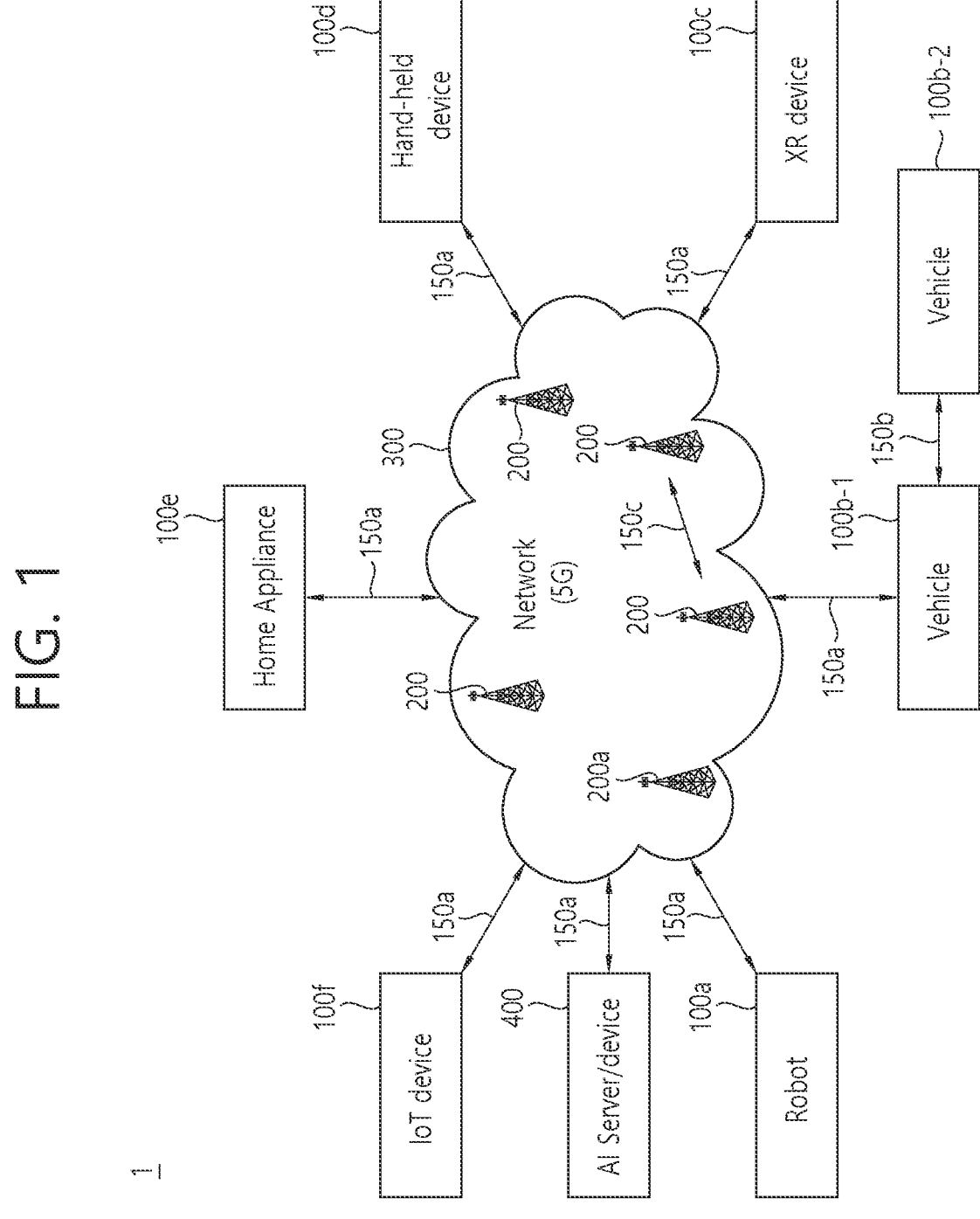
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi). IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example. "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B". "only C", or "any combination of A, B and C". In addition, "at least one of A, B or C" or "at least one of A, B and/or C" may mean "at least one of A. B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without users control or with minimal users control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system. FR1 may mean "sub 6 GHz range". FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE. NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat ML, 3) LTE Cat M2, 4) LTE non-bandwidth limited (non-BL), 5) LTE-MTC, 6) LTE Machine Type Communication. and/or 7) LTE M. and may not be limited to the above-mentioned names. Additionally and/or alternatively, the radio communication technologies implemented in the wireless devices in the present disclosure may include at least one of ZigBee. Bluetooth. and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs. SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
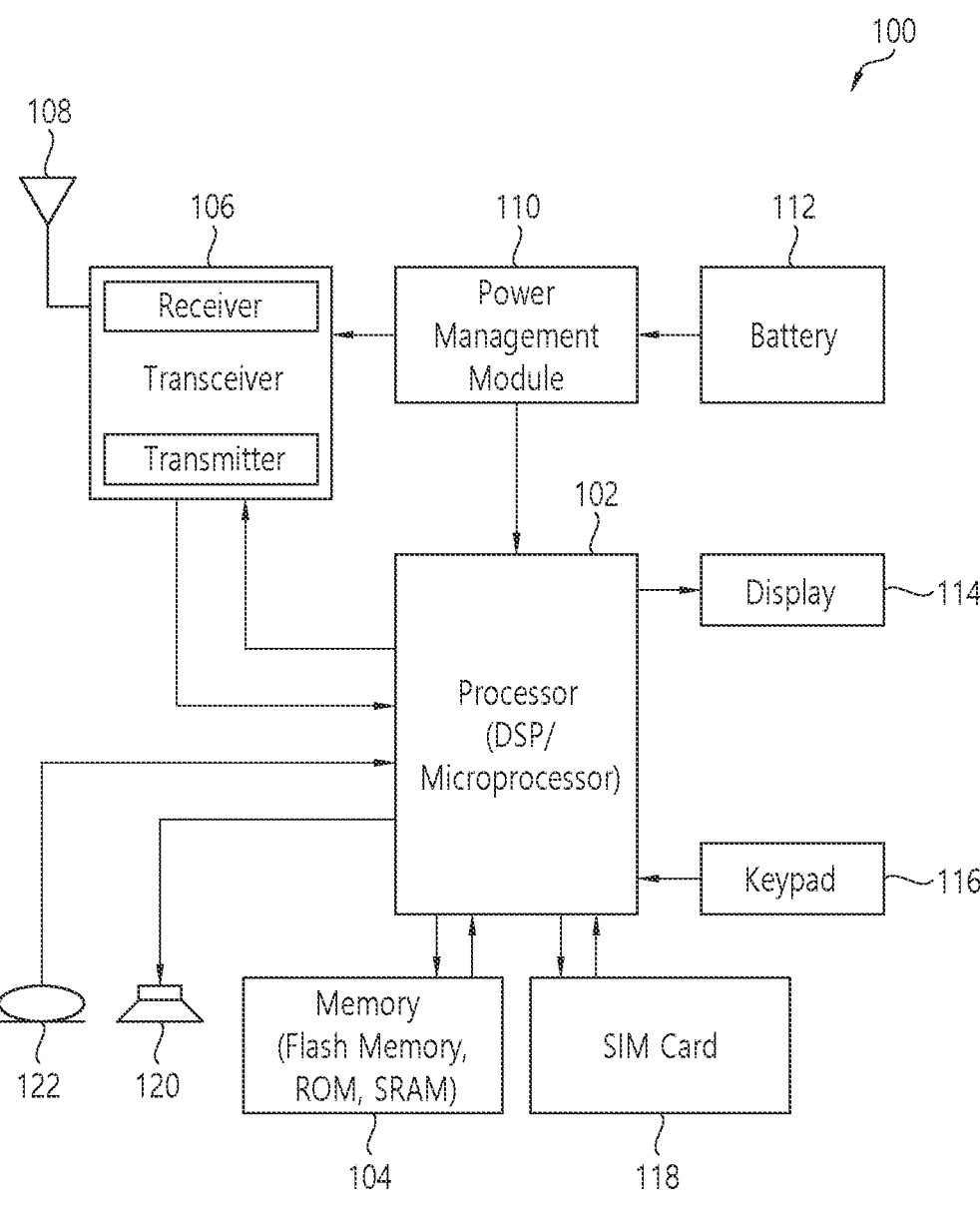
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
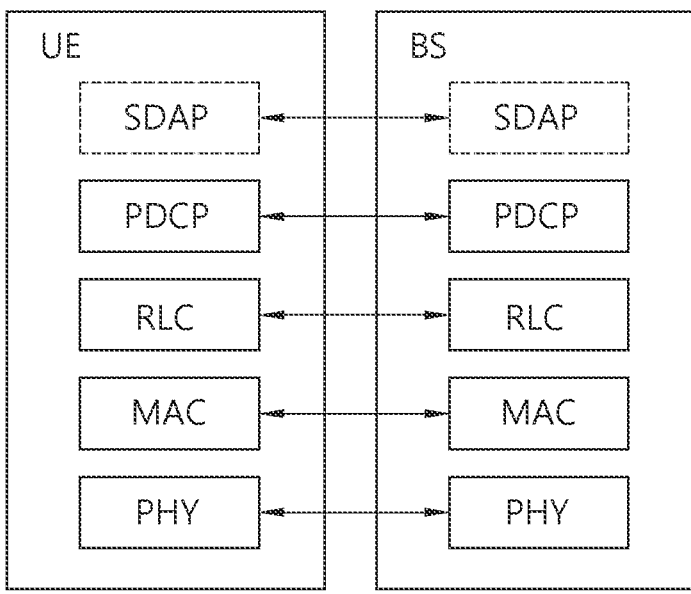
FIGS. 5 and 6 show an example of protocol stacks in a 3GPP based wireless communication system to which implementations of the present disclosure is applied.
Figure 6:
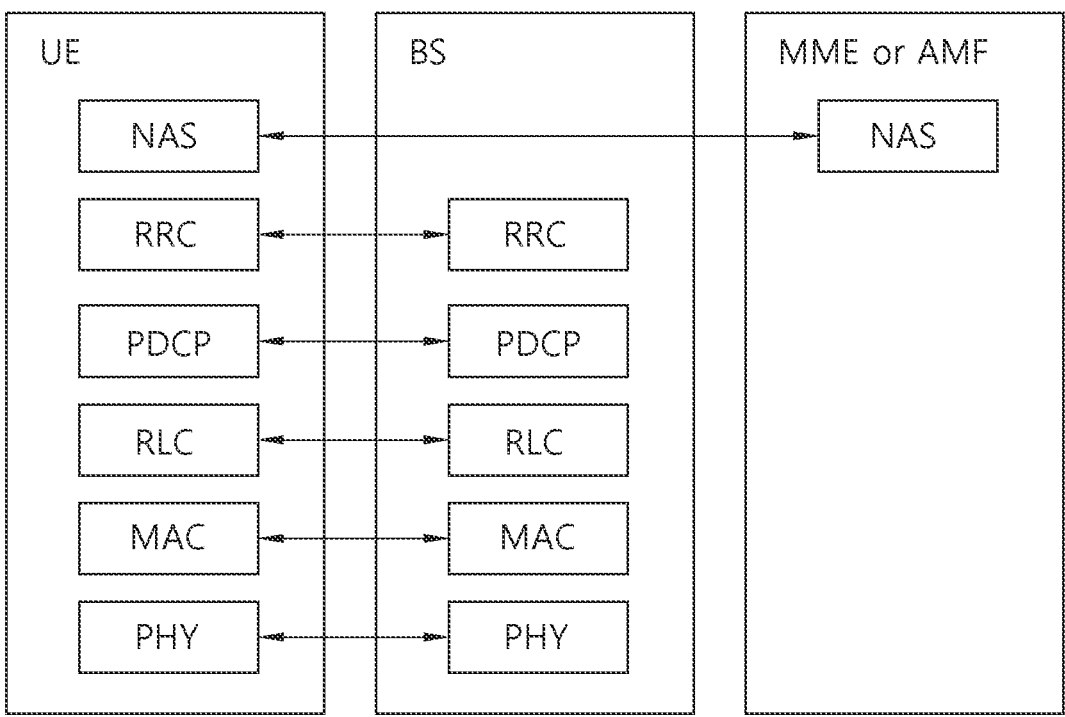

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer). Layer 2. Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection;

transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer. UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
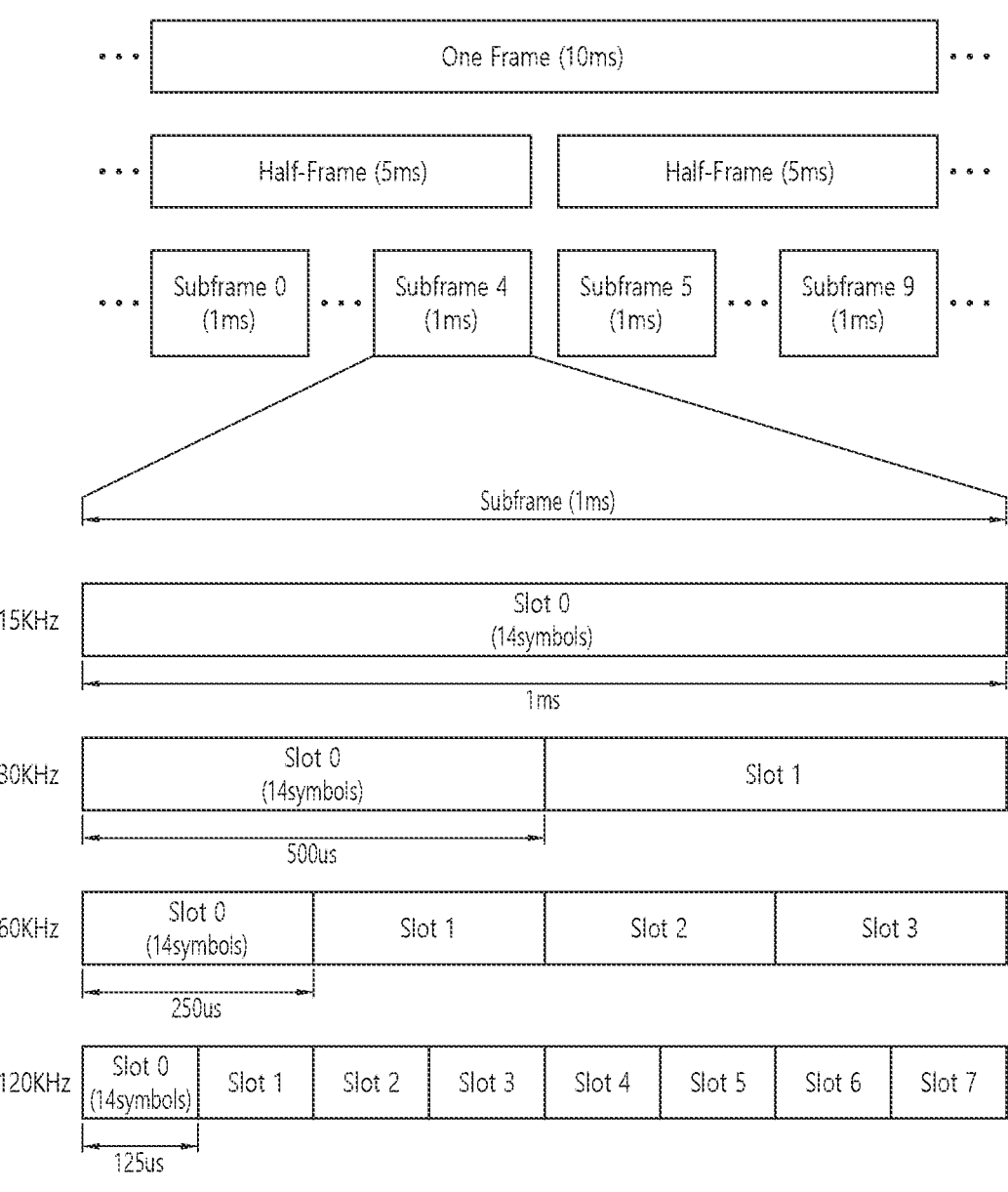
FIG. 7 shows a frame structure in a 3GPP based wireless communication system to which implementations of the present disclosure is applied.

FIG. 7 shows a frame structure in a 3GPP based wireless communication system to which implementations of the present disclosure is applied.

The frame structure shown in FIG. 7 is purely exemplary and the number of subframes, the number of slots, and/or the number of symbols in a frame may be variously changed. In the 3GPP based wireless communication system. OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{frame,u}_{slot}$ for the normal CP, according to the subcarrier spacing $\Delta f=2^u*15$ kHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system. RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 8:
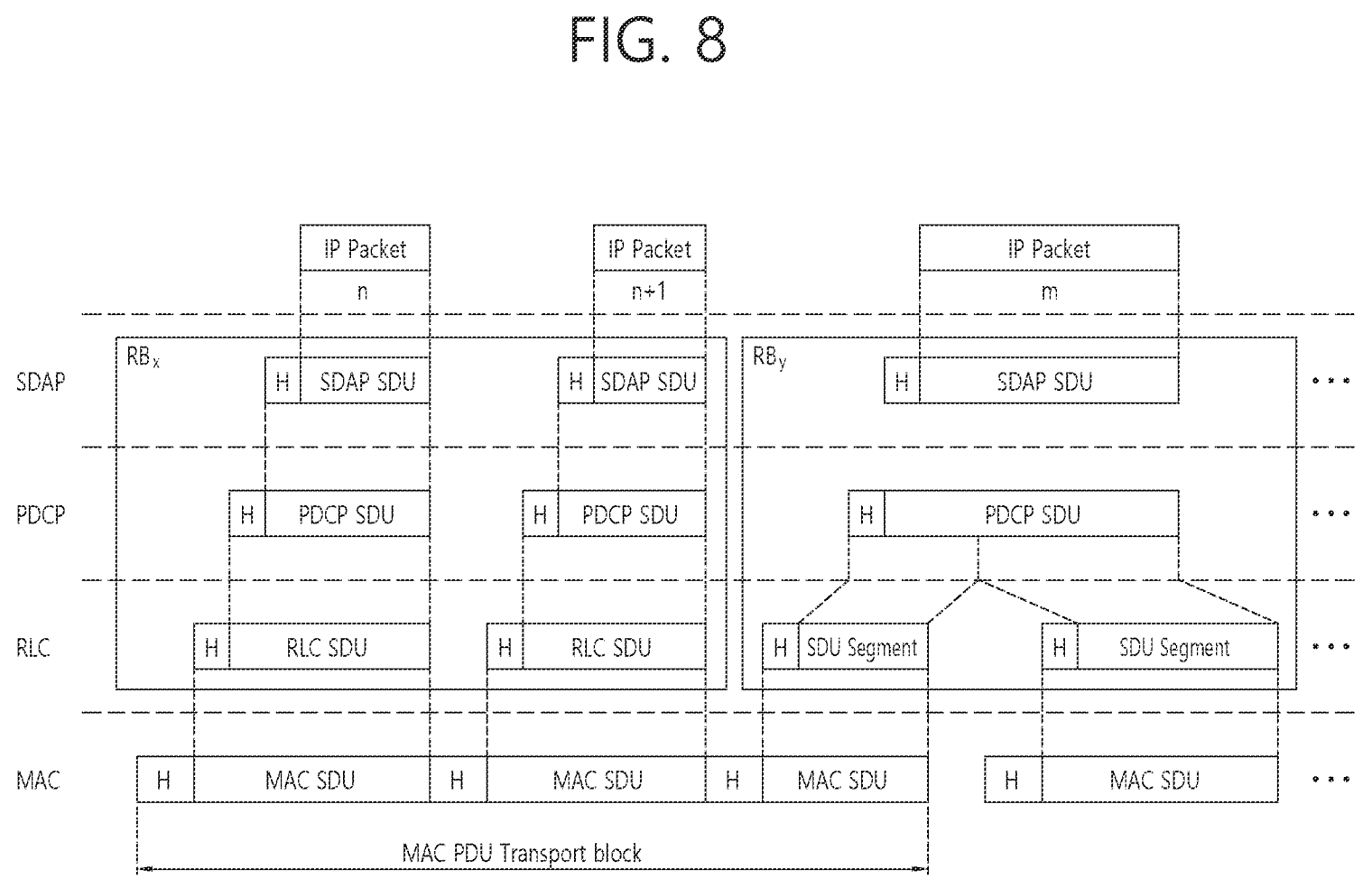

FIG. 8 shows a data flow example in the 3GPP NR system to which implementations of the present disclosure is applied.

Referring to FIG. 8, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Some implementations of sidelink (SL) grant reception and sidelink control information (SCI) transmission are described. Section 5.14.1.1 of 3GPP TS 36.321 V15.8.0 can be referred.

In order to transmit on the sidelink shared channel (SL-SCH), the MAC entity must have at least one sidelink grant.

Sidelink grants are selected as follows for sidelink communication:

> 1> if the MAC entity is configured to receive a single sidelink grant dynamically on the PDCCH and more data is available in sidelink traffic channel (STCH) than can be transmitted in the current sidelink control (SC) period, the MAC entity shall:
>> 2> using the received sidelink grant determine the set of subframes in which transmission of SCI and transmission of first transport block occur:
>> 2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;
>> 2> clear the configured sidelink grant at the end of the corresponding SC period:
> 1> else, if the MAC entity is configured by upper layers to receive multiple sidelink grants dynamically on the PDCCH and more data is available in STCH than can be transmitted in the current SC period, the MAC entity shall for each received sidelink grant:
>> 2> using the received sidelink grant determine the set of subframes in which transmission of SCI and transmission of first transport block occur;
>> 2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available:
>> 2> clear the configured sidelink grant at the end of the corresponding SC period;
> 1> else, if the MAC entity is configured by upper layers to transmit using one or multiple pool(s) of resources and more data is available in STCH than can be transmitted in the current SC period, the MAC entity shall for each sidelink grant to be selected.
>> 2> if configured by upper layers to use a single pool of resources:
>>> 3> select that pool of resources for use;
>> 2> else, if configured by upper layers to use multiple pools of resources:
>>> 3> select a pool of resources for use from the pools of resources configured by upper layers whose associated priority list includes the priority of the highest priority of the sidelink logical channel in the MAC PDU to be transmitted;
>> 2> randomly select the time and frequency resources for SL-SCH and SCI of a sidelink grant from the selected resource pool. The random function shall be such that each of the allowed selections can be chosen with equal probability;

>> 2> use the selected sidelink grant to determine the set of subframes in which transmission of SCI and transmission of first transport block occur;
>> 2> consider the selected sidelink grant to be a configured sidelink grant occurring in those subframes starting at the beginning of the first available SC period which starts at least 4 subframes after the subframe in which the sidelink grant was selected;
>> 2> clear the configured sidelink grant at the end of the corresponding SC period;

Retransmissions on SL-SCH cannot occur after the configured sidelink grant has been cleared.

Sidelink grants are selected as follows for vehicle-to-everything (V2X) sidelink communication:

> 1> if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TI:
>> 2> use the received sidelink grant to determine the number of HARQ retransmissions and the set of subframes in which transmission of SCI and SL-SCH occur;
>> 2> consider the received sidelink grant to be a configured sidelink grant for the carrier:
> 1> if the MAC entity is configured by upper layers to receive a sidelink grant on the PDCCH addressed to SL semi-persistent scheduling (SPS) V2X radio network temporary identity (V-RNTI), the MAC entity shall for each SL SPS configuration and for each carrier configured in sl-V2X-ConfigDedicated for which a sidelink grant has been received on the PDCCH addressed to SL semi-persistent scheduling V-RNTI for this TTI:
>> 2> if PDCCH contents indicate SPS activation:
>>> 3> use the received sidelink grant to determine the number of HARQ retransmissions and the set of subframes in which transmission of SCI and SL-SCH occur;
>>> 3> consider the received sidelink grant to be a configured sidelink grant for the carrier.
>> 2> if PDCCH contents indicate SPS release:
>>> 3> clear the corresponding configured sidelink grant for the carrier.
> 1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each sidelink process configured for multiple transmissions:
>> 2> if there is no configured sidelink grant associated with the sidelink process on any carrier allowed for the STCH as indicated by upper layers:
>>> 3> trigger the TX carrier (re-)selection procedure as specified below;
>> 2> else if there is a configured sidelink grant associated with the sidelink process:
>>> 3> if SL_RESOURCE_RESELECTION_COUNTER=0 and when SL_RESOURCE_RESELECTION_ COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed modulation and coding scheme (MCS) configured by upper layers in naxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated ProSe-per-packet priority (PPPP), and the MAC entity selects not to perform transmission(s) corresponding to a single MAC PDU; or 3> if the pool of resources where the sidelink grant is configured for the sidelink process, is reconfigured by upper layers:

4> trigger the TX carrier (re-)selection procedure as specified below;

4> clear the configured sidelink grant associated to the sidelink process:

4> flush the HARQ buffer associated to the sidelink process;

3> else if SL_RESOURCE_RESELECTION_ COUN-TER=0 and when SL_RESOURCE_RESELECTION_ COUNTER was equal to 1 the MAC entity randomly selected, with equal probability, a value in the interval [0, 1] which is less than or equal to the probability configured by upper layers in probResourceKeep:

4> clear the configured sidelink grant, if available;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RE-SOURCE_RESELECTION_COUNTER to the selected value;

4> use the previously selected sidelink grant for the number of transmissions of the MAC PDUs with the resource reservation interval to determine the set of subframes in which transmissions of SCI and SL-SCH occur:

4> consider the selected sidelink grant to be a configured sidelink grant;

2> if the TX carrier (re-)selection procedure was triggered in above and one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select one of the allowed values configured by upper layers in restrictResourceReservationPeriod and set the resource reservation interval by multiplying 100 with the selected value:

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RE-SOURCE_RESELECTION_COUNTER to the selected value;

4> select the number of HARQ retransmissions from the allowed numbers that are configured by upper layers in allowecdRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the channel busy ratio (CBR) measured by lower layers if CBR measurement results are available or the corresponding defaultTxConfigIndex configured by upper layers if CBR measurement results are not available:

4> select an amount of frequency resources within the range that is configured by upper layers between min-Subchannel-NumberPSSCH and maxSubchannel-NumberPSSCH included in pssch-TxConfigList and, if configured by upper layers, overlapped between min-Subchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available:

4> randomly select the time and frequency resources for one transmission opportunity from the resources indicated by the physical layer, according to the amount of selected frequency resources. The selected time and frequency resources shall fulfil the physical layer requirements, and the random function shall be such that each of the allowed selections can be chosen with equal probability:

4> use the randomly selected resource to select a set of periodic resources spaced by the resource reservation interval for transmission opportunities of SCI and SL-SCH corresponding to the number of transmission opportunities of MAC PDUs;

4> if the number of HARQ retransmissions is equal to 1:

5> if there are available resources left in the resources indicated by the physical layer that meet the conditions for more transmission opportunities:

6> randomly select the time and frequency resources for one transmission opportunity from the available resources, according to the amount of selected frequency resources. The selected time and frequency resources shall fulfil the physical layer requirements, and the random function shall be such that each of the allowed selections can be chosen with equal probability;

6> use the randomly selected resource to select a set of periodic resources spaced by the resource reservation interval for the other transmission opportunities of SCI and SL-SCH corresponding to the number of retransmission opportunities of the MAC PDUs;

6> consider the first set of transmission opportunities as the new transmission opportunities and the other set of transmission opportunities as the retransmission opportunities;

6> consider the set of new transmission opportunities and retransmission opportunities as the selected sidelink grant.

4> else:

5> consider the set as the selected sidelink grant;

4> use the selected sidelink grant to determine the set of subframes in which transmissions of SCI and SL-SCH occur;

4> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a sidelink process:

2> trigger the TX carrier (re-)selection procedure as specified below;

2> if one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select the number of HARQ retransmissions from the allowed numbers that are configured by upper layers in allowedRexNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding default-TxConfigIndex configured by upper layers if CBR measurement results are not available;

4> select an amount of frequency resources within the range that is configured by upper layers between min-Subchannel-NumberPSSCH and maxSubchannel-NumberPSSCH included in pssch-TxConfigList and, if configured by upper layers, overlapped between min-Subchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity of SCI and SL-SCH from the resources indicated by the physical layer, according to the amount of selected frequency resources. The selected time and frequency resources shall fulfil the physical layer requirement, and the random function shall be such that each of the allowed selections can be chosen with equal probability;

4> if the number of HARQ retransmissions is equal to 1:

5> if there are available resources left in the resources indicated by the physical layer that meet the conditions for one more transmission opportunity:

6> randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements, and the random function shall be such that each of the allowed selections can be chosen with equal probability;

6> consider a transmission opportunity which comes first in time as the new transmission opportunity and a transmission opportunity which comes later in time as the retransmission opportunity;

6> consider both of the transmission opportunities as the selected sidelink grant;

4> else:

5> consider the transmission opportunity as the selected sidelink grant;

4> use the selected sidelink grant to determine the sub-frames in which transmission(s) of SCI and SL-SCH occur];

4> consider the selected sidelink grant to be a configured sidelink grant.

For V2X sidelink communication, the UE should ensure the randomly selected time and frequency resources fulfill the latency requirement.

The MAC entity shall for each subframe:

1> for each configured sidelink grant occurring in this subframe:

2> if SL_RESOURCE_RESELECTION_COUNTER=1 for the sidelink process associated with the configured sidelink grant and the MAC entity randomly selected, with equal probability, a value in the interval [0, 1] which is above the probability configured by upper layers in probResourceKeep:

3> set the resource reservation interval for the configured sidelink grant equal to 0;

2> if the configured sidelink grant corresponds to trans-mission of SCI:

3> for V2X sidelink communication in UE autonomous resource selection:

4> consider the selected transmission format to be SL-V2X-TxProfile for the highest priority of the side-link logical channel(s) in the MAC PDU;

4> select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indi-cated in cbr-pssch-TxConfigList associated with the selected transmission format for the highest priority of the sidelink logical channel(s) in the MAC PDU and the CBR measured by lower layers if CBR measure-ment results are available or the corresponding deful-tTxConfigIndex configured by upper layers if CBR measurement results are not available;

3> for V2X sidelink communication in scheduled resource allocation:

4> consider the selected transmission format to be SL-V2X-TxProfile for the highest priority of the side-link logical channel(s) in the MAC PDU;

4> select a MCS which is associated with the selected transmission format unless it is configured by upper layer;

3> instruct the physical layer to transmit SCI correspond-ing to the configured sidelink grant;

3> for V2X sidelink communication, deliver the config-ured sidelink grant, the associated HARQ information and the value of the highest priority of the sidelink logical channel(s) in the MAC PDU to the sidelink HARQ entity for this subframe;

2> else if the configured sidelink grant corresponds to transmission of first transport block for sidelink communication:

3> deliver the configured sidelink grant and the associated HARQ information to the sidelink HARQ entity for this subframe.

Some implementations of sidelink HARQ operation are described. Section 5.14.1.2 of 3GPP TS 36.321 V 15.8.0 can be referred.

The MAC entity is configured by upper layers to transmit using pool(s) of resources on one or multiple carriers. For each carrier, there is one sidelink HARQ entity at the MAC entity for transmission on SL-SCH, which maintains a number of parallel sidelink processes.

For V2X sidelink communication, the maximum number of transmitting sidelink processes associated with each sidelink HARQ entity is 8. A sidelink process may be configured for transmissions of multiple MAC PDUs. For transmissions of multiple MAC PDUs, the maximum number of transmitting sidelink processes associated with each sidelink HARQ entity is 2.

A delivered and configured sidelink grant and its associated HARQ information are associated with a sidelink process.

For each subframe of the SL-SCH and each sidelink process, the sidelink HARQ entity shall 1> if a sidelink grant corresponding to a new transmission opportunity has been indicated for this Sidelink process and there is SL data, for sidelink logical channels of ProSe destination associated with this sidelink grant, available for transmission:

2> obtain the MAC PDU from the "Multiplexing and assembly" entity;

2> deliver the MAC PDU and the sidelink grant and the HARQ information to this sidelink process;

2> instruct this sidelink process to trigger a new transmission.

1> else, if this subframe corresponds to retransmission opportunity for this sidelink process;

2> instruct this sidelink process to trigger a retransmission.

The sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant and with the MCS selected.

If the sidelink process is configured to perform transmissions of multiple MAC PDUs for V2X sidelink communication the process maintains a counter SL_RE-SOURCE_RESELECTION_COUNTER. For other configurations of the sidelink process, this counter is not available.

If the sidelink HARQ entity requests a new transmission, the sidelink process shall:

1> set CURRENT_IRV to 0;

1> store the MAC PDU in the associated HARQ buffer;

1> store the sidelink grant received from the sidelink HARQ entity;

1> generate a transmission as described below.

If the sidelink HARQ entity requests a retransmission, the sidelink process shall:

1> generate a transmission as described below.

To generate a transmission, the sidelink process shall:

1> if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and 1> if there is no sidelink discovery gap for transmission or no transmission on physical sidelink discovery channel (PSDCH) at the time of the transmission; or, in case of transmissions of V2X sidelink communication, if the MAC entity is able to perform transmissions on SL-SCH and transmissions on PSDCH simultaneously at the time of the transmission:

2> instruct the physical layer to generate a transmission according to the stored sidelink grant with the redundancy version corresponding to the CURRENT_IRV value.

1> increment CURRENT_IRV by 1;

1> if this transmission corresponds to the last transmission of the MAC PDU:

2> decrement SL_RESOURCE_RESELECTION_COUNTER by 1, if available.

The transmission of the MAC PDU for V2X sidelink communication is prioritized over uplink transmissions if the following conditions are met:

if the MAC entity is not able to perform all uplink transmissions and all transmissions of V2X sidelink communication simultaneously at the time of the transmission; and if uplink transmission is not prioritized by upper layer; and if the value of the highest priority of the sidelink logical channel(s) in the MAC PDU is lower than thresSL-TxPrioritization if thresSL-TxPrioritization is configured.

Sidelink resource allocation in 5G NR is described. Section 5.3 of 3GPP TS 38.885 V16.0.0 can be referred.

At least the following two SL resource allocation modes may be defined.

Mode 1: BS schedules SL resource(s) to be used by UE for SL transmission(s).

Mode 2: UE determines, i.e. BS does not schedule, SL transmission resource(s) within SL resources configured by BS/network or pre-configured SL resources.

The definition of SL resource allocation Mode 2 covers:

a) UE autonomously selects SL resource for transmission b) UE assists SL resource selection for other UE(s), a functionality which can be part of a), c), d)

c) UE is configured with NR configured grant (Type-1 like) for SL transmission d) UE schedules SL transmissions of other UEs Resource allocation mode 2 supports reservation of SL resources at least for blind retransmission.

Sensing- and resource (re-)selection-related procedures are supported for resource allocation mode 2.

The sensing procedure considered is defined as decoding sidelink control information (SCI(s)) from other UEs and/or SL measurements. Decoding SCI(s) in this procedure provides at least information on SL resources indicated by the UE transmitting the SCI. The sensing procedure uses a L1 SL reference signal received power (RSRP) measurement based on SL demodulation reference signal (DMRS) when the corresponding SCI is decoded.

The resource (re-)selection procedure considered uses the results of the sensing procedure to determine resource(s) for SL transmission.

For mode 2(a), SL sensing and resource selection procedures may be considered in the context of a semi-persistent scheme where resource(s) are selected for multiple transmissions of different transport blocks (TBs) and a dynamic scheme where resource(s) are selected for each TB transmission.

The following techniques are studied to identify occupied SL resources:

Decoding of SL control channel transmissions

SL measurements

Detection of SL transmissions

The following aspects are studied for SL resource selection

How a UE selects resource for physical sidelink control channel (PSCCH) and physical sidelink shared channel (PSSCH) transmission (and other SL physical channel/signals that are defined)

Which information is used by UE for resource selection procedure

For out-of-coverage operation, mode 2(c) assumes a (pre-)configuration of single or multiple SL transmission patterns, defined on each SL resource pool. For in-coverage operation, mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For mode 2(d), in the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signaling is used to provide the configurations. Such functionality is up to UE capability(ies).

Sidelink resource allocation is described in detail. If the TX UE is in RRC_CONNECTED and configured for gNB scheduled sidelink resource allocation (e.g., mode 1), the TX UE may transmit sidelink UE information including traffic pattern of Service, TX carriers and/or RX carriers mapped to service. QoS information related to service (e.g. SQI. ProSe-per-packet priority (PPPP), ProSe-per-packet reliability (PPPR), QoS class identifier (QCI) value), and destination related to service.

After receiving the sidelink UE information, the gNB constructs sidelink configuration at least including one or more resource pools for service and sidelink buffer status reporting (BSR) configuration. The gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a logical channel group (LCG), and a buffer size corresponding to the destination.

After receiving the sidelink BSR, the gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

1. Implementation 1

In conventional sidelink (e.g., V2X) communication in LTE-A, it was not decided to perform HARQ feedback depending on the distance between UEs. On the other hand, sidelink (e.g., V2X) communication in 5G NR introduces communication range between UEs as QoS requirements for logical channels. Accordingly, transmission UE (TX UE) and reception UE (RX UE) may determine its location, and whether to perform HARQ feedback may be determined based on the determined location of UEs and the communication range. However, it is not clearly defined when the TX UE and/or RX UE determines respective location. Especially, in case of retransmission, whether the TX UE and/or RX UE determines respective location whenever retransmission is performed should be clearly addressed.

According to implementations 1 of the present disclosure, the TX UE may determine its location (e.g., zone ID) at the time of TB creation. The TX UE may not determine the zone ID at the time of transmission/re-transmission of the TB.

According to implementations 1 of the present disclosure, the RX UE may receive one or more SCIs scheduling initial and/or retransmission of the same TB. The SCI may repeatedly indicate, in each SCI, the communication range requirement of the TB and the zone ID where the TX UE is located (i.e., location determined at the time of TB creation). The SCI may further indicates HARQ feedback activation. The location of the RX UE may be determined each time after time for each SCI. The RX UE may determine whether to send HARQ feedback in response to each SCI according to the location of the determined RX UE and the communication range requirement and zone ID indicated by each SCI.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 9 shows an example of a method performed by a first device (e.g., RX UE) to which implementation 1 of the present disclosure is applied.

In step S900, the first device receives, from a second device, first control information which schedules a first transmission. The first control information includes 1) a communication range, and 2) a location of the second device.

In some implementations, the location of the second device may correspond to a zone ID indicating a zone whether the second device is located.

In some implementations, the first transmission may be associated with a transmission of a TB. In this case, i) the communication range, and 2) the location of the second device may be included in sidelink transmission information of the TB in the first control information.

In step S910, the first device determines whether to perform a HARQ feedback on the first transmission based on whether a distance between a location of the first device for the first control information and the location of the second device is smaller or equal to the communication range.

In some implementations, the HARQ feedback on the first transmission may be determined to be performed based on the distance between the location of the first device for the first control information and the location of the second device being smaller or equal to the communication range. Or, the HARQ feedback on the first transmission may be determined not to be performed based on the distance between the location of the first device for the first control information and the location of the second device not being smaller or equal to the communication range.

In step S920, the first device receives, from the second device, second control information which schedules a second transmission which is retransmission of the first transmission. The second control information includes 1) the communication range, and 2) the location of the second device.

In some implementations, the second transmission may be associated with a retransmission of the TB. In this case, i) the communication range, and 2) the location of the second device may be included in sidelink transmission information of the TB in the second control information.

In some implementations, the location of the second device included in the second control information may be same as the location of the second device included in the first control information. For example, the location of the second device may be a location of the second device at a time point of creation of the TB. That is, the location of the second device may not be a location of the second device at a time point of receiving the second control information.

In step S930, the first device determines whether to perform a HARQ feedback on the second transmission based on whether a distance between a location of the first device for the second control information and the location of the second device is smaller or equal to the communication range.

In some implementations, the HARQ feedback on the second transmission may be determined to be performed based on the distance between the location of the first device for the second control information and the location of the second device being smaller or equal to the communication range. Or, the HARQ feedback on the second transmission may be determined not to be performed based on the distance between the location of the first device for the second control information and the location of the second device not being smaller or equal to the communication range.

In some implementations, the first control information and/or the second control information may include information on whether the HARQ feedback is enabled or not.

In some implementations, the HARQ feedback may correspond to negative acknowledgement (NACK)-only HARQ feedback.

In some implementations, the first device may be in communication with at least one of a mobile device, a network, and/or autonomous vehicles other than the first device.

According to implementation 1 of the present disclosure shown in FIG. 9, an example of operations of the MAC entity and/or sidelink HARQ entity may be as follows.

Sidelink transmission information is information included in a SCI for a SL-SCH transmission consists of Sidelink HARQ information including new data indicator (NDI), redundancy version (RV), Sidelink process ID, Source Layer-1 ID and Destination Layer-1 ID, and Sidelink QoS information including a priority, a communication range and location information.

The MAC entity includes at most one Sidelink HARQ Entity for transmission on SL-SCH, which maintains a number of parallel Sidelink processes.

A sidelink process may be configured for transmissions of multiple MAC PDUs.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission; and
1> if no MAC PDU has been obtained:
2> associate a Sidelink process to this grant, and for each associated Sidelink process:
3> obtain the MAC PDU to transmit from the Multiplexing and assembly entity, if any;
3> if a MAC PDU to transmit has been obtained:
4> if the sidelink grant was received on PDCCH for SL-RNTI or SLCS-RNTI or if the sidelink grant corresponds to either configured grant Type 1 or configured grant Type 2:
5> associate the HARQ Process ID corresponding to the sidelink grant to the associated Sidelink process;
4> determines Sidelink transmission information of the TB for the source and destination pair of the MAC PDU as follows:
5> set the Source Layer-1 ID to the 16 most significant bit (MSB) of the Source Layer-2 ID of the MAC PDU;
5> set the Destination Layer-1 ID to the 8 MSB of the Destination Layer-2 ID of the MAC PDU;
5> consider the NDI to have been toggled and set the NDI to the toggled value,
5> associate the Sidelink process to a Sidelink process ID;
5> enable HARQ feedback, if sl-HARQ-FeedbackEnabled has been set to Enabled for the logical channel(s) in the MAC PDU, and, if enabled for groupcast, selects either negative-only acknowledgement or positive-negative acknowledgement;
5> set the priority to the value of the highest priority of the logical channel(s) and a MAC CE, if any, if included, in the MAC PDU;
5> if HARQ feedback is enabled for groupcast and UE's location information is available:
6> set the communication range to the value of the longest communication range of the logical channel(s) in the MAC PDU, if configured;
6> set the location information to the Zone_id determined, if configured and UE's location information is available;
4> deliver the MAC PDU, the sidelink grant and the Sidelink transmission information of the TB to the associated Sidelink process;
4> instruct the associated Sidelink process to trigger a new transmission;
4> if the sidelink grant corresponds to either configured grant Type 1 or configured grant Type 2, or if the sidelink grant is addressed to SL-RNTI and the identified HARQ process is configured for a configured sidelink grant Type 1 or 2 (i.e. when the dynamic SL grant overrides the configured sidelink grant Type 1 or 2):
5> start or restart the configuredGrantTimer, if configured, for the associated HARQ process ID when the transmission is performed;

5> start or restart the cg-RetransmissionTimer, if config-
ured, for the associated HARQ process ID when the
transmission is performed.

5> if cg-RetransmissionTimer is configured for the iden-
tified Sidelink process:

5> if the transmission is performed.

6> consider the identified Sidelink process as not pending.

5> else:

6> consider the identified Sidelink process as pending.

3> else:

4> flush the HARQ buffer of the associated Sidelink
process.

1> else (i.e. retransmission):

2> if the HARQ Process ID corresponding to the sidelink
grant received on PDCCH is associated to a Sidelink
process of which HARQ buffer is empty; or 2> if the HARQ Process ID corresponding to the sidelink
grant received on PDCCH is not associated to any
Sidelink process:

3> ignore the sidelink grant.

2> else:

3> identify the Sidelink process associated with this grant,
and for each associated Sidelink process:

4> if sl-MaxTransNum corresponding to the highest pri-
ority of the logical channel(s) in the MAC PDU has
been configured in sl-CG-MaxTransNumList for the
sidelink grant by RRC and the maximum number of
transmissions of the MAC PDU has been reached to
sl-MaxTransNum; or 4> if a positive acknowledgement to a transmission of the
MAC PDU has been received; or 4> if only a negative acknowledgement was enabled in
the SCI and no negative acknowledgement was
received for the most recent (re-)transmission of the
MAC PDU:

5> flush the HARQ buffer of the associated Sidelink
process;

5> stop the configuredGrantTimer, if running.

4> else:

5> deliver the sidelink grant of the MAC PDU to the
associated Sidelink process;

5> instruct the associated Sidelink process to trigger a
retransmission.

4> if the sidelink grant is a configured sidelink grant Type
1 or 2:

5> if the identified Sidelink process is pending:

6> start or restart the configuredGrantTimer for the cor-
responding HARQ process when the transmission is
performed;

5> start or restart the cg-RetransmissionTimer, if config-
ured, for the corresponding HARQ process when the
transmission is performed.

4> if the identified Sidelink process is pending and the
transmission is performed:

5> consider the identified Sidelink process as not pending.

The Sidelink process is associated with a HARQ buffer.

New transmissions and retransmissions are performed on
the resource indicated in the sidelink grant and with the
MCS selected.

If the sidelink process is configured to perform transmis-
sions of multiple MAC PDUs the process maintains a
counter SL_RESOURCE_RESELECTION_COUNTER.
For other configurations of the sidelink process, this counter
is not available.

When cg-RetransmissionTimer is configured and the
Sidelink HARQ entity obtains a MAC PDU to transmit, the
corresponding Sidelink process is considered to be pending.

A pending Sidelink process is pending until a transmission
is performed on that Sidelink process or until the Sidelink
process is flushed.

If the Sidelink HARQ Entity requests anew transmission,
the Sidelink process shall:

1> store the MAC PDU in the associated HARQ buffer;

1> store the sidelink grant received from the Sidelink
HARQ Entity;

1> generate a transmission as described below:

If the Sidelink HARQ Entity requests a retransmission,
the Sidelink process shall:

1> generate a transmission as described below:

To generate a transmission, the Sidelink process shall:

1> if there is no uplink transmission; or

1> if the MAC entity is able to simultaneously perform
uplink transmission(s) and sidelink transmission at the
time of the transmission; or 1> if the other MAC entity and the MAC entity are able
to simultaneously perform uplink transmission(s) and
sidelink transmission at the time of the transmission
respectively; or 1> if there is a MAC PDU to be transmitted for this
duration in uplink, except a MAC PDU obtained from
the Msg3 buffer or prioritized, and the sidelink trans-
mission is prioritized over uplink transmission:

2> instruct the physical layer to transmit SCI according to
the stored sidelink grant with the associated Sidelink
transmission information;

2> instruct the physical layer to generate a transmission
according to the stored sidelink grant;

2> if sl-HARQ-FeedbackEnabled has been set to enabled
for the logical channel(s) in the MAC PDU:

3> instruct the physical layer to monitor physical sidelink
feedback channel (PSFCH) for the transmission.

1> if this transmission corresponds to the last transmis-
sion of the MAC PDU:

2> decrement SL_RESOURCE_RESELECTION-
_COUNTER by 1, if available.

2> stop the configuredGrantTimer, if running;

2> stop the cg-Retransmission Timer, if running.

1> if sl-MaxTransNum corresponding to the highest pri-
ority of the logical channel(s) in the MAC PDU has
been configured in sl-CG-MaxTransNumList for the
sidelink grant by RRC and the maximum number of
transmissions of the MAC PDU has been reached to
sl-MaxTransNum; or 1> if a positive acknowledgement to a transmission of the
MAC PDU has been received; or 1> if only a negative acknowledgement was enabled in
the SCI and no negative acknowledgement was
received for the most recent (re-)transmission of the
MAC PDU:

2> stop the configuredGrantTimer, if running.

If the configuredGrantTimer expires for a HARQ process,
the HARQ process shall:

1> stop the cg-RetransmissionTimer, if running.

The transmission of the MAC PDU is prioritized over
uplink transmissions of the MAC entity or the other MAC
entity if the following conditions are met:

1> if the MAC entity is not able to perform this sidelink
transmission simultaneously with all uplink transmis-
sions at the time of the transmission, and 1> if uplink transmission is neither prioritized nor priori-
tized by upper layer; and 1> if the value of the highest priority of logical channel(s) and a MAC CE in the MAC PDU is lower than sl-PrioritizationThres if sl-PrioritizationThres is configured.

The MAC entity shall for each PSSCH transmission:

1> if an acknowledgement corresponding to the PSSCH transmission is obtained from the physical layer:

2> deliver the acknowledgement to the corresponding Sidelink HARQ entity for the Sidelink process;

1> else:

2> deliver a negative acknowledgement to the corresponding Sidelink HARQ entity for the Sidelink process:

If sl-PUCCH-Config is configured by RRC, the MAC entity shall for each MAC PDU on the PSSCH transmission and for the PUCCH resource used for reporting an acknowledgement corresponding to the PSSCH transmission to NG-RAN:

1> if the PUCCH resource occasion overlaps with neither a UL-SCH resource nor a SL-SCH resource; or 1> if a SL-SCH resource overlaps with the PUCCH resource, and the MAC entity is not able to perform this PUCCH transmission simultaneously with the transmission of the SL-SCH resource, and either transmission on the SL-SCH resource is not prioritized or the value of the highest priority of the logical channel(s) and a MAC CE, if any, in the MAC PDU is lower than sl-Prioritizationthres, if configured, or the highest priority of the logical channel(s) and a MAC CE, if any, in the MAC PDU is higher than the highest priority of another MAC PDU to be transmitted on the SL-SCH resource; or 1> if a UL-SCH resource overlaps with the PUCCH resource, and the MAC entity is not able to perform this PUCCH transmission simultaneously with the transmission of the UL-SCH resource, and either transmission on the UL-SCH resource is not prioritized or the value of the highest priority of the logical channel(s) and a MAC CE, if any, in the MAC PDU is lower than sl-Prioritizationthres, if configured, or the highest priority of the logical channel(s) and a MAC CE, if any, in the MAC PDU is higher than the highest priority of another MAC PDU to be transmitted on the UL-SCH resource, or the value of the highest priority of the logical channel(s) and a MAC CE, if any, in the MAC PDU is higher than ul-Prioritizationthres, if configured:

2> if a positive acknowledgement has been received for the MAC PDU; or

2>[if sl-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum]

3> instruct the physical layer to signal a positive acknowledgement on the PUCCH.

2> else if the PSSCH transmission was not prioritized:

3> instruct the physical layer to signal a negative acknowledgement on the PUCCH.

2> else:

3> instruct the physical layer to signal an acknowledgement on the PUCCH.

Furthermore, the method in perspective of the first device described above in FIG. 9 may be performed by the first wireless device 100 shown in FIG. 2, the wireless device 100 shown in FIG. 3, and/or the UE 100 shown in FIG. 4.

More specifically, the first device comprises at least one transceiver, at least one processor, and at least one computer memory operably connectable to the at least one processor and storing instructions that, based on being executed by the at least one processor, perform operations below.

The operations comprise receiving, from a second device, first control information which schedules a first transmission. The first control information includes 1) a communication range, and 2) a location of the second device.

In some implementations, the location of the second device may correspond to a zone ID indicating a zone whether the second device is located.

In some implementations, the first transmission may be associated with a transmission of a TB. In this case, i) the communication range, and 2) the location of the second device may be included in sidelink transmission information of the TB in the first control information.

The operations comprise determining whether to perform a HARQ feedback on the first transmission based on whether a distance between a location of the first device for the first control information and the location of the second device is smaller or equal to the communication range.

In some implementations, the HARQ feedback on the first transmission may be determined to be performed based on the distance between the location of the first device for the first control information and the location of the second device being smaller or equal to the communication range. Or, the HARQ feedback on the first transmission may be determined not to be performed based on the distance between the location of the first device for the first control information and the location of the second device not being smaller or equal to the communication range.

The operations comprise receiving, from the second device, second control information which schedules a second transmission which is retransmission of the first transmission. The second control information includes 1) the communication range, and 2) the location of the second device.

In some implementations, the second transmission may be associated with a retransmission of the TB. In this case, i) the communication range, and 2) the location of the second device may be included in sidelink transmission information of the TB in the second control information.

In some implementations, the location of the second device included in the second control information may be same as the location of the second device included in the first control information. For example, the location of the second device may be a location of the second device at a time point of creation of the TB. That is, the location of the second device may not be a location of the second device at a time point of receiving the second control information.

The operations comprise determining whether to perform a HARQ feedback on the second transmission based on whether a distance between a location of the first device for the second control information and the location of the second device is smaller or equal to the communication range.

In some implementations, the HARQ feedback on the second transmission may be determined to be performed based on the distance between the location of the first device for the second control information and the location of the second device being smaller or equal to the communication range. Or, the HARQ feedback on the second transmission may be determined not to be performed based on the distance between the location of the first device for the second control information and the location of the second device not being smaller or equal to the communication range.

In some implementations, the first control information and/or the second control information may include information on whether the HARQ feedback is enabled or not.

In some implementations, the HARQ feedback may correspond to NACK-only HARQ feedback.

Furthermore, the method in perspective of the first device described above in FIG. 9 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a device operating in a wireless communication system (e.g., first device) comprises at least one processor, and at least one computer memory operably connectable to the at least one processor. The at least one processor is configured to perform operations comprising: obtaining first control information which schedules a first transmission, wherein the first control information includes 1) a communication range, and 2) a location of the second device, determining whether to perform a HARQ feedback on the first transmission based on whether a distance between a location of the first device for the first control information and the location of the second device is smaller or equal to the communication range, obtaining second control information which schedules a second transmission which is retransmission of the first transmission, wherein the second control information includes 1) the communication range, and 2) the location of the second device, and determining whether to perform a HARQ feedback on the second transmission based on whether a distance between a location of the first device for the second control information and the location of the second device is smaller or equal to the communication range.

Furthermore, the method in perspective of the first device described above in FIG. 9 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining first control information which schedules a first transmission, wherein the first control information includes 1) a communication range, and 2) a location of the second device, determining whether to perform a HARQ feedback on the first transmission based on whether a distance between a location of the first device for the first control information and the location of the second device is smaller or equal to the communication range, obtaining second control information which schedules a second transmission which is retransmission of the first transmission, wherein the second control information includes 1) the communication range, and 2) the location of the second device, and determining whether to perform a HARQ feedback on the second transmission based on whether a distance between a location of the first device for the second control information and the location of the second device is smaller or equal to the communication range.

Figure 10:
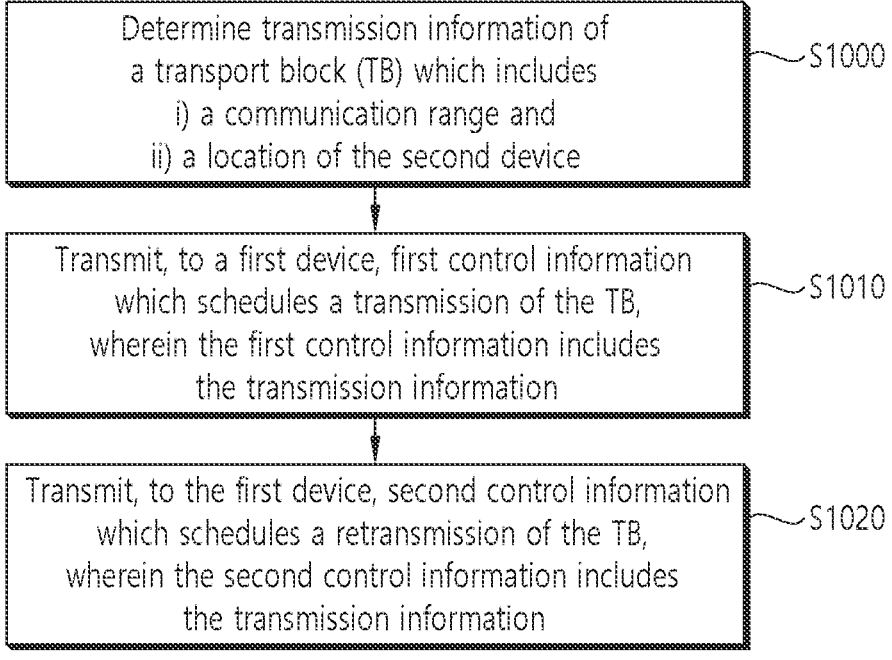
FIG. 10 shows an example of a method performed by a second device (e.g., TX UE) to which implementation 1 of the present disclosure is applied.

FIG. 10 shows an example of a method performed by a second device (e.g., TX UE) to which implementation 1 of the present disclosure is applied.

In step S1000, the second device determines transmission information of a TB which includes i) a communication range and ii) a location of the second device.

In some implementations, the location of the second device may correspond to a zone ID indicating a zone whether the second device is located.

In some implementations, the location of the second device is a location of the second device at a time point of creation of the TB.

In some implementations, the communication range corresponds to a value of a longest communication range of a logical channel in a MAC PDU.

In step S1010, the second device transmits, to a first device, first control information which schedules a transmission of the TB. The first control information includes the transmission information.

In step S1020, the second device transmits, to the first device, second control information which schedules a retransmission of the TB. The second control information includes the transmission information (i.e., without further determining the transmission information at the time point of transmitting the second control information).

In some implementations, the first control information and/or the second control information includes information on whether a HARQ feedback is enabled or not.

In some implementations, the second device is in communication with at least one of a mobile device, a network, and/or autonomous vehicles other than the second device.

According to implementation 1 of the present disclosure shown in FIG. 10, an example of operations of the MAC entity and/or sidelink HARQ entity may be as follows.

SCI indicate if there is a transmission on SL-SCH and provide the relevant HARQ information. A SCI consists of two parts: the $1^{st}$ stage SCI on PSCCH and the $2^{nd}$ stage SCI on PSSCH.

The MAC entity shall:

1> for each PSCCH duration during which the MAC entity monitors PSCCH:

2> if a $1^{st}$ stage SCI for this PSSCH duration has been received on the PSCCH:

3> determine the set of PSSCH durations in which reception of a $2^{nd}$ stage SCI and the transport block occur using the received part of the SCI;

3> if the $2^{nd}$ stage SCI for this PSSCH duration has been received on the PSSCH:

4> store the SCI as a valid SCI for the PSSCH durations corresponding to transmission(s) of the transport block and the associated HARQ information and QoS information;

1> for each PSSCH duration for which the MAC entity has a valid SCI:

2> deliver the SCI and the associated Sidelink transmission information to the Sidelink HARQ Entity.

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs Sidelink transmission information and associated TBs received on the SL-SCH to the corresponding Sidelink processes.

For each PSSCH duration, the Sidelink HARQ Entity shall:

1> for each SCI valid for this PSSCH duration:

2> if the NDI has been toggled compared to the value of the previous received transmission corresponding to this TB or this is the very first received transmission for this TB:

3> allocate the TB received from the physical layer and the associated Sidelink transmission information to an unoccupied Sidelink process, associate the Sidelink process with this SCI and consider this transmission to be a new transmission.

1> for each Sidelink process:

2> if the NDI has been not toggled compared to the value of the previous received transmission corresponding to this TB for the Sidelink process according to its associated SCI:

3> allocate the TB received from the physical layer to the Sidelink process and consider this transmission to be a retransmission.

2> else if the HARQ buffer of the Sidelink process is not empty:

3> flush the HARQ buffer.

For each PSSCH duration where a transmission takes place for the Sidelink process, one TB and the associated HARQ information is received from the Sidelink HARQ Entity.

For each received TB and associated Sidelink transmission information, the Sidelink process shall:

1> if this is a new transmission:

2> attempt to decode the received data.

1> else if this is a retransmission:

2> if the data for this TB has not yet been successfully decoded:

3> instruct the physical layer to combine the received data with the data currently in the soft buffer for this TB and attempt to decode the combined data.

1> if the data which the MAC entity attempted to decode was successfully decoded for this TB; or 1> if the data for this TB was successfully decoded before:

2> if this is the first successful decoding of the data for this TB, if the SRC field of the decoded MAC PDU subheader is equal to the 16 MSB of any of the Source Layer-2 ID(s) of the UE for which the 8 least significant bit (LSB) are equal to the Source ID in the corresponding SCI, and if the DST field of the decoded MAC PDU subheader is equal to the 8 MSB of any of the Destination Layer-2 ID(s) of the UE for which the 16 LSB are equal to the Destination ID in the corresponding SCI:

3> deliver the decoded MAC PDU to the disassembly and demultiplexing entity;

3> consider the Sidelink process as unoccupied.

1> else:

2> instruct the physical layer to replace the data in the soft buffer for this TB with the data which the MAC entity attempted to decode.

1> if HARQ feedback is enabled by the SCI that indicates a Zone_id and a communication range:

2> if distance between UE's location and the central location of the Zone_id is smaller or equal to the communication range:

3> instruct the physical layer to generate an acknowledgement of the data in this TB.

1> else if HARQ feedback is enabled by the SCI:

2> instruct the physical layer to generate an acknowledgement of the data in this TB.

Furthermore, the method in perspective of the second device described above in FIG. 10 may be performed by the second wireless device 200 shown in FIG. 2, the wireless device 200 shown in FIG. 3, and/or the UE 100 shown in FIG. 4.

More specifically, the second device comprises at least one transceiver, at least one processor, and at least one computer memory operably connectable to the at least one processor and storing instructions that, based on being executed by the at least one processor, perform operations below.

The operations comprise determining transmission information of a TB which includes i) a communication range and ii) a location of the second device.

In some implementations, the location of the second device may correspond to a zone ID indicating a zone whether the second device is located.

In some implementations, the location of the second device is a location of the second device at a time point of creation of the TB.

In some implementations, the communication range corresponds to a value of a longest communication range of a logical channel in a MAC PDU.

The operations comprise transmitting, to a first device, first control information which schedules a transmission of the TB. The first control information includes the transmission information.

The operations comprise transmitting, to the first device, second control information which schedules a retransmission of the TB. The second control information includes the transmission information (i.e., without further determining the transmission information at the time point of transmitting the second control information).

In some implementations, the first control information and/or the second control information includes information on whether a HARQ feedback is enabled or not.

Furthermore, the method in perspective of the second device described above in FIG. 10 may be performed by control of the processor 202 included in the second wireless device 200 shown in FIG. 2, by control of the communication unit 110 and/or the control unit 120 included in the wireless device 200 shown in FIG. 3, and/or by control of the processor 102 included in the UE 100 shown in FIG. 4.

More specifically, a device operating in a wireless communication system (e.g., second device) comprises at least one processor, and at least one computer memory operably connectable to the at least one processor. The at least one processor is configured to perform operations comprising: determining transmission information of a TB which includes i) a communication range and ii) a location of the second device, generating first control information which schedules a transmission of the TB, wherein the first control information includes the transmission information, and generating second control information which schedules a retransmission of the TB, wherein the second control information includes the transmission information.

Furthermore, the method in perspective of the second device described above in FIG. 10 may be performed by a software code 205 stored in the memory 204 included in the second wireless device 200 shown in FIG. 2.

More specifically, at least one CRM stores instructions that, based on being executed by at least one processor, perform operations comprising: determining transmission information of a TB which includes i) a communication range and ii) a location of the second device, generating first control information which schedules a transmission of the TB, wherein the first control information includes the transmission information, and generating second control information which schedules a retransmission of the TB, wherein the second control information includes the transmission information.

Figure 11:
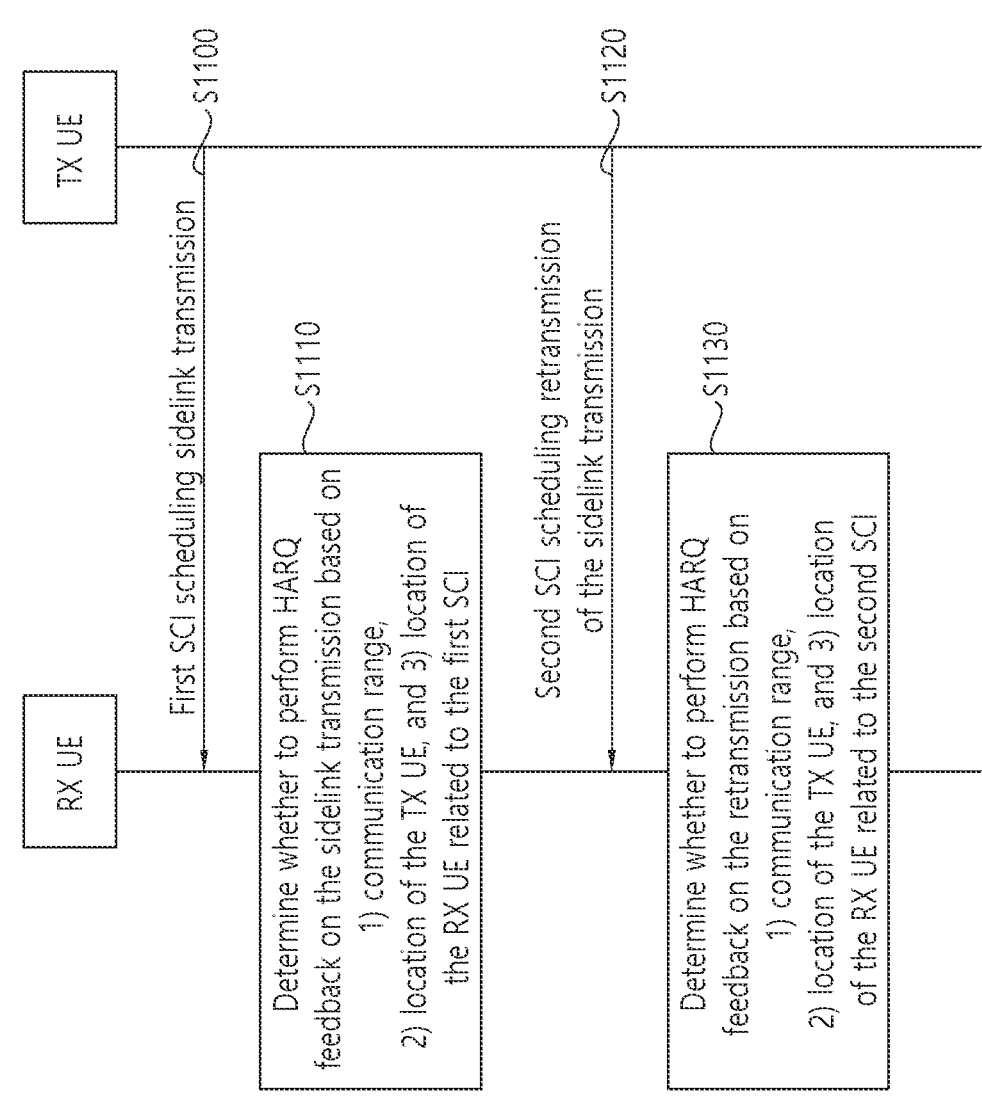
FIG. 11 shows an example of a method performed by TX UE and RX UE in sidelink to which implementation 1 of the present disclosure is applied.

FIG. 11 shows an example of a method performed by TX UE and RX UE in sidelink to which implementation 1 of the present disclosure is applied.

In step S1100, the TX UE transmits a first SCI scheduling sidelink transmission.

In some implementations, the first SCI may include sidelink transmission information. The sidelink transmission information may include 1) a communication range, and 2) a location of the TX UE.

In some implementations, the location of the TX UE may correspond to a zone ID indicating a zone whether the TX UE is located.

In some implementations, the sidelink transmission may be associated with a transmission of a TB. The sidelink transmission may be associated with the TB.

In step S1110, the RX UE determines whether to perform a HARQ feedback on the sidelink transmission based on 1) communication range, 2) location of the TX UE, and 3) location of the RX UE related to the first SCI.

In some implementations, the HARQ feedback on the sidelink transmission may be determined to be performed based on the distance between the location of the RX UE related to the first SCI and the location of the TX UE being smaller or equal to the communication range. Or, the HARQ feedback on the sidelink transmission may be determined not to be performed based on the distance between the location of the RX UE related to the first SCI and the location of the TX UE not being smaller or equal to the communication range.

In step S1120, the TX UE transmits a second SCI scheduling retransmission of the sidelink transmission.

In some implementations, the second SCI may include sidelink transmission information. The sidelink transmission information may include 1) a communication range, and 2) a location of the TX UE.

In some implementations, the sidelink transmission may be associated with a retransmission of a TB. The sidelink transmission may be associated with the TB.

In some implementations, the location of the TX UE included in the second SCI may be same as the location of the TX UE included in the first SCI. For example, the location of the TX UE may be a location of the TX UE at a time point of creation of the TB. That is, the location of the TX UE may not be a location of the TX UE at a time point of transmitting the second SCI.

In step S1130, the RX UE determines whether to perform a HARQ feedback on the retransmission based on 1) communication range, 2) location of the TX UE, and 3) location of the RX UE related to the second SCI.

In some implementations, the HARQ feedback on the retransmission may be determined to be performed based on the distance between the location of the RX UE related to the second SCI and the location of the TX UE being smaller or equal to the communication range. Or, the HARQ feedback on the retransmission may be determined not to be performed based on the distance between the location of the RX UE related to the second SCI and the location of the TX UE not being smaller or equal to the communication range.

In some implementations, the first SCI and/or the second SCI may include information on whether the HARQ feedback is enabled or not.

In some implementations, the HARQ feedback may correspond to NACK-only HARQ feedback.

According to implementation 1 of the present disclosure, the RX UE can determine its location of at each SCI, allowing to calculate the distance between the RX UE and TX UE more accurately.

According to implementation 1 of the present disclosure, by calculating the distance between the RX UE and TX UE more accurately, whether to perform HARQ feedback can be determined more accurately by comparing the distance between the RX UE and TX UE and the communication range requirement.

2. Implementation 2

When multiple configured grants are configured, some of them can be overlapped. Or, a configured grant can be overlapped with other type of transmission. In this case, how to solve such collision is not clear.

Figure 12:
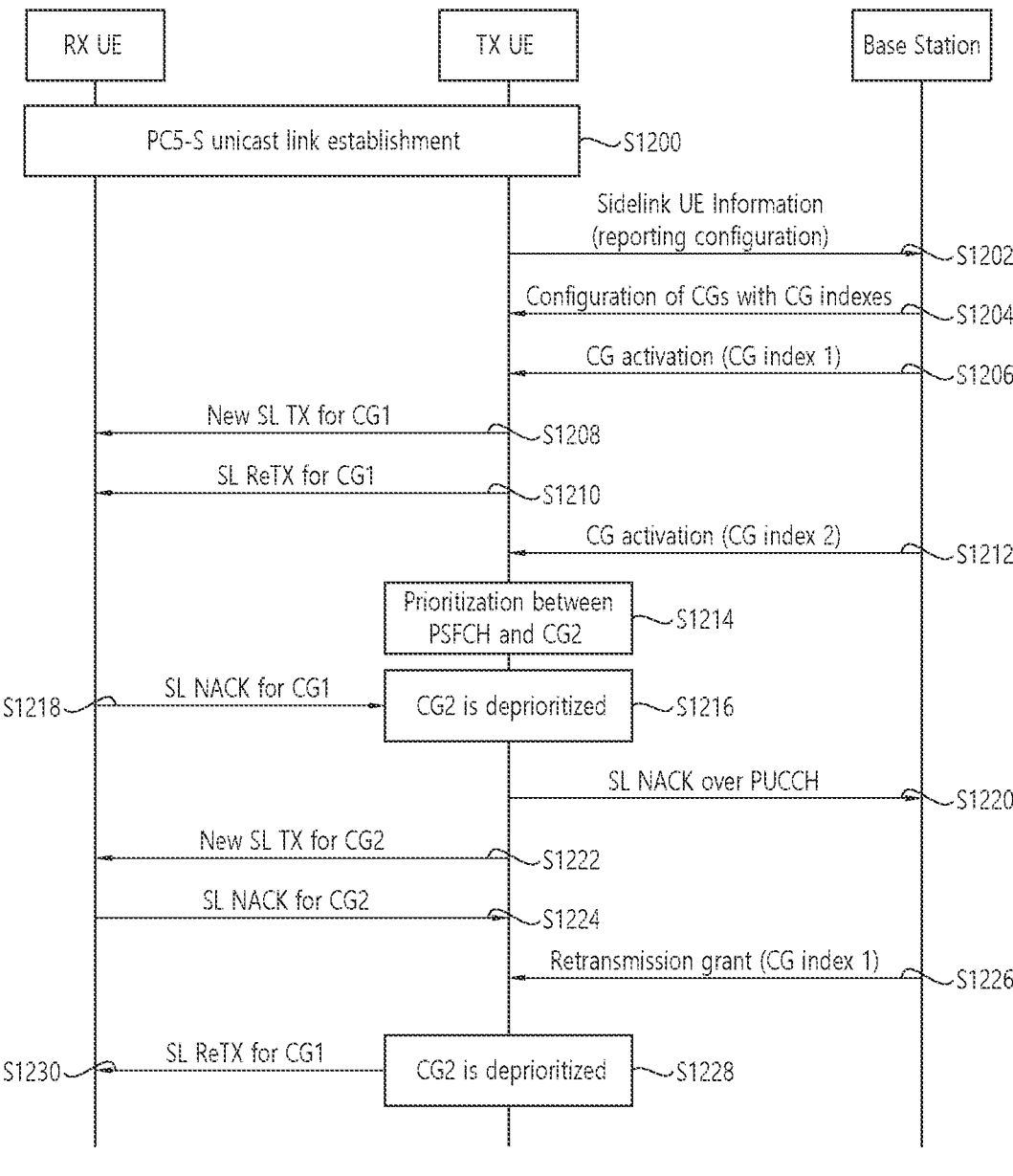
FIG. 12 shows an example of sidelink transmission using sidelink configured grants to which implementation 2 of the present disclosure is applied.

FIG. 12 shows an example of sidelink transmission using sidelink configured grants to which implementation 2 of the present disclosure is applied.

In step S1200, the RX UE establishes a PC5-S unicast link and the associated PC5-RRC connection with TX UE. TX UE may transmit a PC5-RRC Reconfiguration.

In step S1202, the TX UE sends Sidelink UE information indicating the destination ID of the TX UE to the network.

In step S1204, the TX UE acquires/allocates a set of resources. The TX UE may be configured with one or more configured grants (CGs) by the network.

It is assumed in FIG. 12 that CG1 having CG index 1 and CG2 having CG index 2 are configured.

For example, if the TX UE is in RRC_CONNECTED and configured for gNB scheduled sidelink resource allocation (e.g., Mode 1), the TX may be configured with one or more configured grants by the network. e.g., by receiving DCI in PDCCH. The DCI may include an allocated sidelink resource. The TX UE may use the sidelink grant for transmission to the RX UE. If the TX UE is configured for UE autonomous scheduling of sidelink resource allocation (e.g., Mode 2) regardless of RRC state, the TX UE may autonomously select or reselect sidelink resources from a resource pool to create a sidelink grant used for transmission to the RX UE.

For example, the configured grant may be used for either uplink or sidelink transmission.

For example, the configured grant may consist of periodic transmission occasions. Each periodic transmission occasion may comprise one new transmission resource and up to two retransmission resources.

For example, the TX UE may determine a configured grant timer and/or configured grant retransmission timer for each configured grant.

For example, the value of the configured grant timer may be determined based on the QoS characteristics such as the minimum packet delay budget (PDB) value of logical channels which can be mapped to the configured grant.

In step S1206, the TX UE receives activation for CG1.

In step S1208, the TX UE performs new sidelink transmission for CG1 to the RX UE.

In step S1210, the TX UE performs sidelink retransmission for CG1 to the RX UE.

In step S1212, the TX UE receives activation for CG2.

In step S1214, the TX UE determines a priority of each configured grant (e.g., CG1 and CG2) and/or priority of configured grant and PSFCH reception and/or PUCCH transmission.

It is assumed in FIG. 12 that the TX UE determines priorities between PSFCH reception for CG1 in response to the sidelink transmission for CG1 and sidelink transmission for CG2.

For example, the network may indicate the priority of each configured grant.

For example, the TX UE may determine the priority of each configured grant by itself based on the highest priority of logical channels and/or a MAC CE carried in a MAC PDU over the configured grant.

For example, the TX UE may determine the priority of each configured grant by itself based on the priority of a destination which can be mapped to the configured grant.

For example, if multiple configured grants are overlapped and the TX UE cannot perform simultaneous transmissions over the overlapped configured grants, the TX UE may determine priorities of each configured grant in order to perform only one of the transmissions over the overlapped configured grants. The priorities between each configured grant may be determined as follows.

A transmission of a configured grant carrying a packet with a shorter PDB values may be prioritized over a transmission of the other configured grant carrying packets with longer PDB values, based on the PDBs of logical channels or QoS flows carrying the packets.

The first transmission (i.e., initial transmission) of a configured grant in a period of the configured grant may be prioritized over retransmission of the other configured grant. Alternatively, retransmission of a configured grant may be prioritized over the first transmission of the other configured grant in a period of the other configured grant.

The MAC CE transmission of a configured grant may be prioritized over a transmission of the other configured grant.

The RRC message transmission of a configured grant may be prioritized over a transmission of the other configured grant.

Unicast transmission of a configured grant may be prioritized over a transmission (e.g., broadcast/groupcast transmission) of the other configured grant.

Sidelink transmission of a configured grant may be prioritized over uplink transmission of the other configured grant.

For example, if the configured grant is overlapped with PSFCH reception and/or PUCCH transmission, and the TX UE cannot perform simultaneous transmissions of the configured grant and PSFCH reception and/or PUCCH transmission, the TX UE may determine priorities of configured grant and PSFCH reception and/or PUCCH transmission in order to perform only one of the transmissions and/or receptions. For example, if at least one of the following conditions is met, the transmission of the configured grant may be prioritized over PSFCH reception and/or PUCCH transmission.

if there is no overlapping PSSCH duration of a configured sidelink grant, in the same BWP whose priority is higher than the priority of the sidelink grant, or if there is no overlapping PSSCH duration of a configured sidelink grant, in the same BWP whose priority value is lower than a threshold; and if there is no overlapping PSFCH resource with an acknowledgement corresponding to the PSSCH transmission scheduled by a SCI of which L1 priority is higher than the priority of the sidelink grant or if there is no overlapping PSFCH resource with an acknowledgement corresponding to the PSSCH transmission scheduled by a SCI of which L1 priority value is lower than a threshold:

if there is no overlapping PUCCH resource with reporting an acknowledgement corresponding to the PSSCH transmission of a MAC PDU in which the priority of the logical channel or the MAC CE is higher than the priority of the sidelink grant or if there is no overlapping PUCCH resource with reporting an acknowledgement corresponding to the PSSCH transmission of a MAC PDU in which the priority value of the logical channel or the MAC CE is lower than a threshold:

there is no overlapping PUCCH resource with a scheduling request (SR) transmission where the priority of the logical channel or the MAC CE that triggered the SR is higher than the priority of the sidelink grant or if there is no overlapping PUCCH resource with an SR transmission where the priority value of the logical channel or the MAC CE that triggered the SR is lower than a threshold.

For example, if the above condition is not met, the transmission of the configured grant may be de-prioritized than overlapped other transmission, e.g., PSFCH reception and/or PUCCH transmission.

In step S1216, the TX UE determines that PSFCH reception for CG1 in response to the sidelink transmission for CG1 is prioritized over sidelink transmission for CG2. Therefore, CG2 is deprioritized.

In step S1218, according to the prioritization in step S1216, the TX UE receives sidelink NACK for CG1 from the RX UE.

In step S1220, the TX UE delivers sidelink NACK for CG1 over PUCCH.

In step S1222, the TX UE performs new sidelink transmission for CG2 to the RX UE.

In step S1224, the TX UE receives sidelink NACK for CG2 from the RX UE.

In step S1226, the TX UE receives a retransmission grant for CG1.

In step S1228, the TX UE determines priorities between sidelink retransmission for CG1 and sidelink retransmission for CG2 and/or PUCCH transmission for CG2. The TX UE determines sidelink retransmission for CG1 is prioritized over sidelink retransmission for CG2 and/or PUCCH transmission for CG2. Therefore, CG2 is deprioritized.

In step S1230, the TX UE performs sidelink retransmission for CG1 to the RX UE.

In summary, in FIG. 12, two configured grants, i.e., CG1 and CG2, are activated for sidelink. For example, the highest priority of logical channels and/or a MAC CE in the MAC PDU carried over CG1 has a higher priority than the highest priority of logical channels and/or a MAC CE the MAC PDU carried over CG2. In other words, CG1 is prioritized over CG2. Thus, the PSCCH/PSSCH transmission, the PSFCH reception and the PUCCH transmission for CG1 have a higher priority than the PSCCH/PSSCH transmission, the PSFCH reception and the PUCCH transmission for CG2. The TX UE may also deprioritize new transmission of CG2 over retransmission of CG1. Thus, new transmission of CG2 may be performed in a next CG2 resource.

Alternatively, if new transmission has a higher priority than retransmission, the TX UE can exceptionally prioritize new transmission of CG2 over retransmission of CG1, even though the highest priority of logical channels and/or a MAC CE in the MAC PDU carried over CG1 has a higher priority than the highest priority of logical channels and/or a MAC CE the MAC PDU carried over CG2.

According to implementation 2 of the present disclosure shown in FIG. 12, an example of operations of the MAC entity may be as follows.

The MAC entity shall for each PSSCH duration:
1> for each configured sidelink grant occurring in this PSSCH duration:
2> if the MAC entity has been configured by RRC to transmit using a SL-RNTI or SLCS-RNTI:
3> select a MCS which is, if configured, within the range that is configured by RRC between sl-MinMCS-PSSCH and sl-MaxMCS-PSSCH included in SL-ScheduledConfig;
2> else:
3> select a MCS which is, if configured, within the range that is configured by RRC between sl-MmnACS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by RRC if CBR measurement results are available or the corresponding sl-defaultTxConfigIndex configured by RRC if CBR measurement results are not available;
2> if the sidelink grant is addressed to SLCS-RNTI for the HARQ process ID identified by a PDCCH and overlaps with a PSSCH resource of a configured sidelink grant Type 1 or 2:
3> if the Sidelink process associated to the HARQ process ID is not empty and if the priority of the sidelink grant is higher than the priority of the overlapped configured sidelink grant Type 1 or 2 (e.g. when retransmission SL grant of another configured sidelink grant Type 1 or 2 of which priority is above a threshold overrides the configured sidelink grant Type 1 or 2 of which priority is lower than a threshold):
4> replace the overlapped configured sidelink grant Type 1 or 2, if activated, by the sidelink grant addressed to SLCS-RNTI during the periodicity of the overlapped configured grant Type 1 or 2;
4> consider the transmission in this PSSCH duration as a retransmission for the identified HARQ process for the configured sidelink grant Type 1 or 2, if the transmission is the first transmission in the corresponding periodicity for the configured sidelink grant Type 1 or 2;
4> set the HARQ Process ID to the identified HARQ Process ID for this PSSCH duration and all subsequent PSSCH duration(s) occurring in the periodicity of the overlapped configured grant Type 1 or 2.
3> else:
4> ignore the sidelink grant addressed to SLCS-RNTI.
2> else if the configured sidelink grant corresponds to the first PSSCH transmission in the corresponding periodicity for an activated configured grant Type 1 or 2:
3> set the HARQ Process ID to the HARQ Process ID associated with this PSSCH duration and all subsequent PSSCH duration(s) occurring in the periodicity for the activated configured grant Type 1 or 2:
3> if, for the corresponding HARQ process ID, the configuredGrantTimer is not running and cg-RetransmissionTimer is not configured (i.e. new transmission):
4> consider the NDI bit for the corresponding HARQ process ID to have been toggled;
4> deliver the sidelink grant, the selected MCS, and the associated HARQ information to the Sidelink HARQ Entity for this PSSCH duration.
2> else:
3> if the cg-RetransmissionTimer for the corresponding HARQ process ID is configured and not running, then for the corresponding HARQ process ID:
4> if the configuredGrantTimer is not running, and the HARQ process is not pending (i.e. new transmission):
5> consider the NDI bit to have been toggled;
5> deliver the configured uplink grant and the associated HARQ information to the HARQ entity.
4> else if the previous uplink grant delivered to the HARQ entity for the same HARQ process was a configured uplink grant (i.e. retransmission on configured grant):
5> deliver the configured uplink grant and the associated HARQ information to the HARQ entity.
3> deliver the sidelink grant, the selected MCS, and the associated HARQ information to the Sidelink HARQ Entity for this PSSCH duration.

For a configured grant Type 1 or 2, the HARQ Process ID associated with the first symbol of a SL transmission is derived from the following equation:

HARQ Process ID=[floor(CURRENT_symbol/periodicity)] modulo nrofHARQ-Processes where CURRENT_symbol=(SFN×numberOfSlotsPerFrame×numberOfSymbolsPerSlot+slot number in the frame×numberOfsymbolsPerSlot+symbol number in the slot), and numberOfSlotsPerFrame and numberOfSymbolPerSlot refer to the number of consecutive slots per frame and the number of consecutive symbols per slot, respectively.

CURRENT_symbol refers to the symbol index of the first transmission occasion of a repetition bundle that takes place.

A HARQ process is configured for a configured sidelink grant if the configured sidelink grant is activated and the associated HARQ process ID is less than nrofHARQ-Processes.

If the MAC entity receives both a grant in a Random Access Response and an overlapping grant for its C-RNTI or CS-RNTI, requiring concurrent transmissions on the SpCell, the MAC entity may choose to continue with either the grant for its RA-RNTI or the grant for its C-RNTI or CS-RNTI.

For the MAC entity configured with sl-lch-basedPrioritization, priority of an sidelink grant is determined by the highest priority among priorities of the logical channels with data available and a MAC CE, if any, which are multiplexed or can be multiplexed in the MAC PDU, according to the mapping restrictions.

When the MAC entity is configured, with sl-lch-basedPrioritization, for each uplink grant which is not already a de-prioritized uplink grant:

1> if this sidelink grant is addressed to SLCS-RNTI:

2> if there is no overlapping PSSCH duration of a configured sidelink grant, in the same BWP whose priority is higher than the priority of the sidelink grant, or if there is no overlapping PSSCH duration of a configured sidelink grant, in the same BWP whose priority value is lower than a threshold; and 2> if there is no overlapping PSFCH resource with an acknowledgement corresponding to the PSSCH transmission scheduled by a SCI of which L1 priority is higher than the priority of the sidelink grant or if there is no overlapping PSFCH resource with an acknowledgement corresponding to the PSSCH transmission scheduled by a SCI of which L1 priority value is lower than a threshold:

2> if there is no overlapping PUCCH resource with reporting an acknowledgement corresponding to the PSSCH transmission of a MAC PDU in which the priority of the logical channel or the MAC CE is higher than the priority of the sidelink grant or if there is no overlapping PUCCH resource with reporting an acknowledgement corresponding to the PSSCH transmission of a MAC PDU in which the priority value of the logical channel or the MAC CE is lower than a threshold:

2> if there is no overlapping PUCCH resource with an SR transmission where the priority of the logical channel or the MAC CE that triggered the SR is higher than the priority of the sidelink grant or if there is no overlapping PUCCH resource with an SR transmission where the priority value of the logical channel or the MAC CE that triggered the SR is lower than a threshold:

3> this sidelink grant is a prioritized sidelink grant;

3> the other overlapping sidelink grant(s), if any, is a de-prioritized sidelink grant.

1> else if this sidelink grant is a configured sidelink grant Type 1 or 2:

2> if there is no overlapping PSSCH duration of another configured sidelink grant, in the same BWP, whose priority is higher than the priority of the sidelink grant; and 2> if there is no overlapping PSSCH duration of an sidelink grant addressed to SLCS-RNTI or SL-RNTI, in the same BWP, whose priority is higher than or equal to the priority of the sidelink grant; and 2> if there is no overlapping PSFCH resource with an acknowledgement corresponding to the PSSCH transmission scheduled by a SCI of which L1 priority is higher than the priority of the sidelink grant or if there is no overlapping PSFCH resource with an acknowledgement corresponding to the PSSCH transmission scheduled by a SCI of which L1 priority value is lower than a threshold:

2> if there is no overlapping PUCCH resource with reporting an acknowledgement corresponding to the PSSCH transmission of a MAC PDU in which the priority of the logical channel or the MAC CE is higher than the priority of the sidelink grant or if there is no overlapping PUCCH resource with reporting an acknowledgement corresponding to the PSSCH transmission of a MAC PDU in which the priority value of the logical channel or the MAC CE is lower than a threshold:

2> if there is no overlapping PUCCH resource with an SR transmission where the priority of the logical channel or the MAC CE that triggered the SR is higher than the priority of the sidelink grant or if there is no overlapping PUCCH resource with an SR transmission where the priority value of the logical channel or the MAC CE that triggered the SR is lower than a threshold:

3> this sidelink grant is a prioritized sidelink grant;

3> the other overlapping sidelink grant(s), if any, is a de-prioritized sidelink grant.

When there is overlapping PSSCH duration of at least two configured sidelink grants whose priorities are equal, the following configured sidelink grant can be prioritized over the other configured sidelink grant:

the configured sidelink grant carrying a MAC CE or RRC signaling the configured sidelink grant used for initial transmission (alternatively, the configured sidelink grant used for retransmission)

the configured sidelink grant carrying logical channels or a MAC CE with the smallest PDB among PDBs of logical channels and a MAC CE which can be multiplexed into overlapped configured sidelink grants According to implementation 2 of the present disclosure, a UE performing HARQ transmissions of multiple configured grants can properly prioritize new transmission or retransmission of a configured grant, in particular when multiple configured grants overlap or a configured grant overlaps with other type of transmission.

According to implementation 2 of the present disclosure, the system can properly handle multiple types of transmissions for a UE performing HARQ transmissions.

In the description above, for the sake of the convenience, sidelink transmission between two UEs is exemplarily described. The present disclosure is not limited thereto, so the present disclosure may be applied to uplink transmission between one UE and one base station. For example, sidelink configured grants describe above can be replaced by uplink configured grants. Or, one configured grant may be sidelink configured grant while the other configured grant may be uplink configured grant.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a first device from a second device, sidelink control information, wherein the sidelink control information includes sidelink transmission information including i) a communication range, and ii) a zone identifier (ID) related to the second device, wherein the sidelink transmission information is associated with a sidelink grant, and wherein the communication range and the zone ID included in the sidelink transmission information are set based on a determination that the sidelink grant relates to only an initial transmission, not a retransmission;

for each physical sidelink shared channel (PSSCH) duration, delivering, by the first device, the sidelink control information and the sidelink transmission information to a sidelink hybrid automatic repeat request (HARQ) entity, wherein the sidelink HARQ entity directs the sidelink transmission information and associated transport blocks (TBs) received on a sidelink shared channel (SL-SCH) to a corresponding sidelink process; and for each PSSCH duration, generating, by the first device, information related to an acknowledgement for a TB, based on i) a hybrid automatic repeat request (HARQ) feedback being enabled by the sidelink control information, and ii) a distance between a location of the first device and a central location based on the zone ID indicating a zone being smaller or equal to the communication range.

2. The method of claim 1, wherein the sidelink transmission information included in the sidelink control information is same for the sidelink grant related to both the initial transmission and the retransmission.

3. The method of claim 1, wherein the communication range and the zone ID are set at a time point of determining the sidelink transmission information.

4. The method of claim 1, wherein the sidelink transmission information includes information related to whether the HARQ feedback is enabled or not.

5. The method of claim 1, wherein the HARQ feedback corresponds to negative acknowledgement (NACK)-only HARQ feedback.

6. The method of claim 5, wherein the acknowledgement is a negative acknowledgement based on the NACK-only HARQ feedback.

7. The method of claim 1, wherein the location of the first device is determined upon reception of the sidelink control information.

8. The method of claim 1, wherein the communication range is set to a value of a longest communication range of logical channels in a media access control (MAC) protocol data unit (PDU) related to the TB.

9. The method of claim 1, wherein the first device is in communication with at least one of a mobile device, a network, and/or autonomous vehicles other than the first device.

10. A first device comprising:

at least one transceiver;

at least one processor; and at least one memory operably connectable to the at least one processor and storing instructions that, based on being executed by the at least one processor, perform operations comprising:

receiving, from a second device via the at least one transceiver, sidelink control information, wherein the sidelink control information includes sidelink transmission information including i) a communication range, and ii) a zone identifier (ID) related to the second device, wherein the sidelink transmission information is associated with a sidelink grant, and wherein the communication range and the zone ID included in the sidelink transmission information are set based on a determination that the sidelink grant relates to only an initial transmission, not a retransmission;

for each physical sidelink shared channel (PSSCH) duration, delivering the sidelink control information and the sidelink transmission information to a sidelink hybrid automatic repeat request (HARQ) entity, wherein the sidelink HARQ entity directs the sidelink transmission information and associated transport blocks (TBs) received on a sidelink shared channel (SL-SCH) to a corresponding sidelink process; and for each PSSCH duration, generating information related to an acknowledgement for a TB, based on i) a hybrid automatic repeat request (HARQ) feedback being enabled by the sidelink control information, and ii) a distance between a location of the first device and a central location based on the zone ID indicating a zone being smaller or equal to the communication range.

11. A non-transitory computer readable medium (CRM) storing instructions that, based on being executed by at least one processor, perform operations comprising:

receiving sidelink control information, wherein the sidelink control information includes sidelink transmission information including i) a communication range, and ii) a zone identifier (ID) related to a second wireless device, wherein the sidelink transmission information is associated with a sidelink grant, and wherein the communication range and the zone ID included in the sidelink transmission information are set based on a determination that the sidelink grant relates to only an initial transmission, not a retransmission;

for each physical sidelink shared channel (PSSCH) duration, delivering the sidelink control information and the sidelink transmission information to a sidelink hybrid automatic repeat request (HARQ) entity, wherein the sidelink HARQ entity directs the sidelink transmission information and associated transport blocks (TBs) received on a sidelink shared channel (SL-SCH) to a corresponding sidelink process; and for each PSSCH duration, generating information related to an acknowledgement for a TB, based on i) a hybrid automatic repeat request (HARQ) feedback being enabled by the sidelink control information, and ii) a distance between a location of a first wireless device and a central location based on the zone ID indicating a zone being smaller or equal to the communication range.

* * * * *